United States Patent
Ida et al.

(10) Patent No.: US 11,132,235 B2
(45) Date of Patent: Sep. 28, 2021

(54) DATA PROCESSING METHOD, DISTRIBUTED DATA PROCESSING SYSTEM AND STORAGE MEDIUM

(71) Applicant: HITACHI, LTD., Tokyo (JP)

(72) Inventors: Yoshihisa Ida, Tokyo (JP); Saori Mitsunaga, Tokyo (JP); Tsukasa Hosoya, Tokyo (JP); Atsuyoshi Morishima, Tokyo (JP); Yoshiki Aoyama, Tokyo (JP)

(73) Assignee: HITACHI, LTD., Tokyo (JP)

( * ) Notice: Subject to any disclaimer, the term of this patent is extended or adjusted under 35 U.S.C. 154(b) by 464 days.

(21) Appl. No.: 16/082,553

(22) PCT Filed: Feb. 16, 2017

(86) PCT No.: PCT/JP2017/005614
§ 371 (c)(1),
(2) Date: Sep. 6, 2018

(87) PCT Pub. No.: WO2018/150503
PCT Pub. Date: Aug. 23, 2018

(65) Prior Publication Data
US 2019/0042317 A1    Feb. 7, 2019

(51) Int. Cl.
*G06F 9/50* (2006.01)
*G06F 17/15* (2006.01)
(Continued)

(52) U.S. Cl.
CPC .......... *G06F 9/5061* (2013.01); *G06F 9/5027* (2013.01); *G06F 12/00* (2013.01); *G06F 12/12* (2013.01); *G06F 17/15* (2013.01)

(58) Field of Classification Search
CPC ...... G06F 9/5061; G06F 12/00; G06F 9/5027; G06F 17/15; G06F 12/12; G06F 16/27; G06F 16/25
(Continued)

(56) References Cited

U.S. PATENT DOCUMENTS 6,014,655 A * 1/2000 Fujiwara ........... G06F 16/24557
707/999.003
6,467,051 B1 * 10/2002 Browen ......... G01R 31/318502
702/183
(Continued)

FOREIGN PATENT DOCUMENTS

JP    2014-096177 A    5/2014
WO    2007/070491 A2    6/2007
WO    2015/114830 A1    8/2015

*Primary Examiner* — Phong H Nguyen
(74) *Attorney, Agent, or Firm* — Mattingly & Malur, PC

(57) ABSTRACT

A data processing method of a distributed data processing system, in which the base server collects and standardizes data and generates base data by node cut processing, the central server collects the attribute information of the column of the base data from a plurality of base servers and the relationship between the integration source and the integration destination of the base data by the node cut processing of the base server as base column integrated information, a combination of an integration source and an integration destination capable of reducing the data amount as a result of an replacement for calculating a combination of an integration source and an integration destination capable of reducing the data amount by exchanging the integration source and the integration destination when data is combined, the combination is notified to the base server as an exchange instruction.

13 Claims, 26 Drawing Sheets

FIG. 1

(51) Int. Cl.
    *G06F 12/12*     (2016.01)
    *G06F 12/00*     (2006.01)

(58) Field of Classification Search
    USPC .................................... 707/736, 769, 797
    See application file for complete search history.

(56) References Cited

U.S. PATENT DOCUMENTS

| | | | |
|---|---|---|---|
| 8,260,803 B2* | 9/2012 | Hsu | G06F 16/24568 |
| | | | 707/769 |
| 8,478,889 B2* | 7/2013 | Bestgen | G06F 16/24568 |
| | | | 709/231 |
| 2007/0124363 A1* | 5/2007 | Lurie | H04L 67/10 |
| | | | 709/202 |
| 2012/0078951 A1* | 3/2012 | Hsu | G06F 16/24532 |
| | | | 707/769 |
| 2015/0142775 A1* | 5/2015 | Kang | G06F 16/24544 |
| | | | 707/714 |
| 2016/0321213 A1* | 11/2016 | Miyamoto | G06F 17/15 |

* cited by examiner

57 BASE COLUMN INFORMATION TABLE

| COLUMN ID (571) | COLUMN NAME (572) | COLUMN ATTRIBUTE (573) |
|---|---|---|
| 1 | EXTERNAL TEMPERATURE | TEMPERATURE |
| 2 | EXTERNAL HUMIDITY | HUMIDITY |
| : | : | : |

*FIG. 8*

58 BASE COLUMN INTEGRATION TABLE

| # (581) | INTEGRATION DESTINATION (582) | INTEGRATION SOURCE (583) | NUMBER OF MATCHING LINES (584) |
|---|---|---|---|
| 1 | EXTERNAL TEMPERATURE | TEMPERATURE OF DEVICE 1 | 60000 |
| 2 | EXTERNAL TEMPERATURE | SENSITIVITY OF DEVICE 1 | 59000 |
| : | : | : | : |

*FIG. 9*

59 COLUMN PRIORITY TABLE

| # (591) | PRIORITY COLUMN ID (592) | NON-PRIORITY COLUMN ID (593) |
|---|---|---|
| 1 | 01 | 04 |
| 2 | 09 | 02 |
| : | : | : |

*FIG. 10*

27 BASE SERVER INFORMATION TABLE

| # | BASE ID | NUMBER OF SENSORS | NUMBER OF LINES OF DATA | DATA SIZE (byte) |
|---|---------|-------------------|-------------------------|------------------|
| 01 | 001 | 2000 | 65534 | 1,234,567,890 |
| 02 | 002 | 1500 | 60000 | 555,555,555 |
| : | | : | : | : |

28 COLUMN ATTRIBUTE INFORMATION TABLE

| COLUMN ID | 1 | 2 | 3 | 4 | 5 | ... | n |
|---|---|---|---|---|---|---|---|
| COLUMN NAME | EXTERNAL TEMPERATURE | EXTERNAL HUMIDITY | TEMPERATURE OF DEVICE 1 | SENSITIVITY OF DEVICE 1 | HUMIDITY OF DEVICE 1 | ... | ... |
| COLUMN ATTRIBUTE | TEMPERATURE | HUMIDITY | TEMPERATURE | DEVICE STATUS | HUMIDITY | ... | ... |

281 — COLUMN ID
282 — COLUMN NAME
283 — COLUMN ATTRIBUTE

FIG. 13

29 COLUMN INTEGRATION INFORMATION TABLE

| COLUMN ID | 1 | 2 | 3 | 4 | 5 | ... | n |
|---|---|---|---|---|---|---|---|
| INTEGRATED RATE | 0% | 0% | 100% | 90% | 0% | ... | ... |
| BASE ID = 1 INTEGRATION INFORMATION | NONE | NONE | 1 | NONE | NONE | ... | ... |
| BASE ID = 2 INTEGRATION INFORMATION | NONE | NONE | 1 | 1 | NONE | ... | ... |

291 — COLUMN ID
292 — INTEGRATED RATE
293 — BASE ID = 1 INTEGRATION INFORMATION
294 — BASE ID = 2 INTEGRATION INFORMATION

30 COLUMN STATUS INFORMATION

| COLUMN ID | 1 | 2 | 3 | 4 | ... | n |
|---|---|---|---|---|---|---|
| COMPARISON COLUMN ID=1 | | - | - | - | ... | - |
| COMPARISON COLUMN ID=2 | 0% MATCH | | - | - | ... | - |
| COMPARISON COLUMN ID=3 | 100% MATCH | 0% MATCH | | - | ... | - |
| COMPARISON COLUMN ID=4 | 90% MATCH | 0% MATCH | 90% MATCH | | ... | - |
| : | : | : | : | : | : | - |

*FIG. 14*

Figures 15, 16:
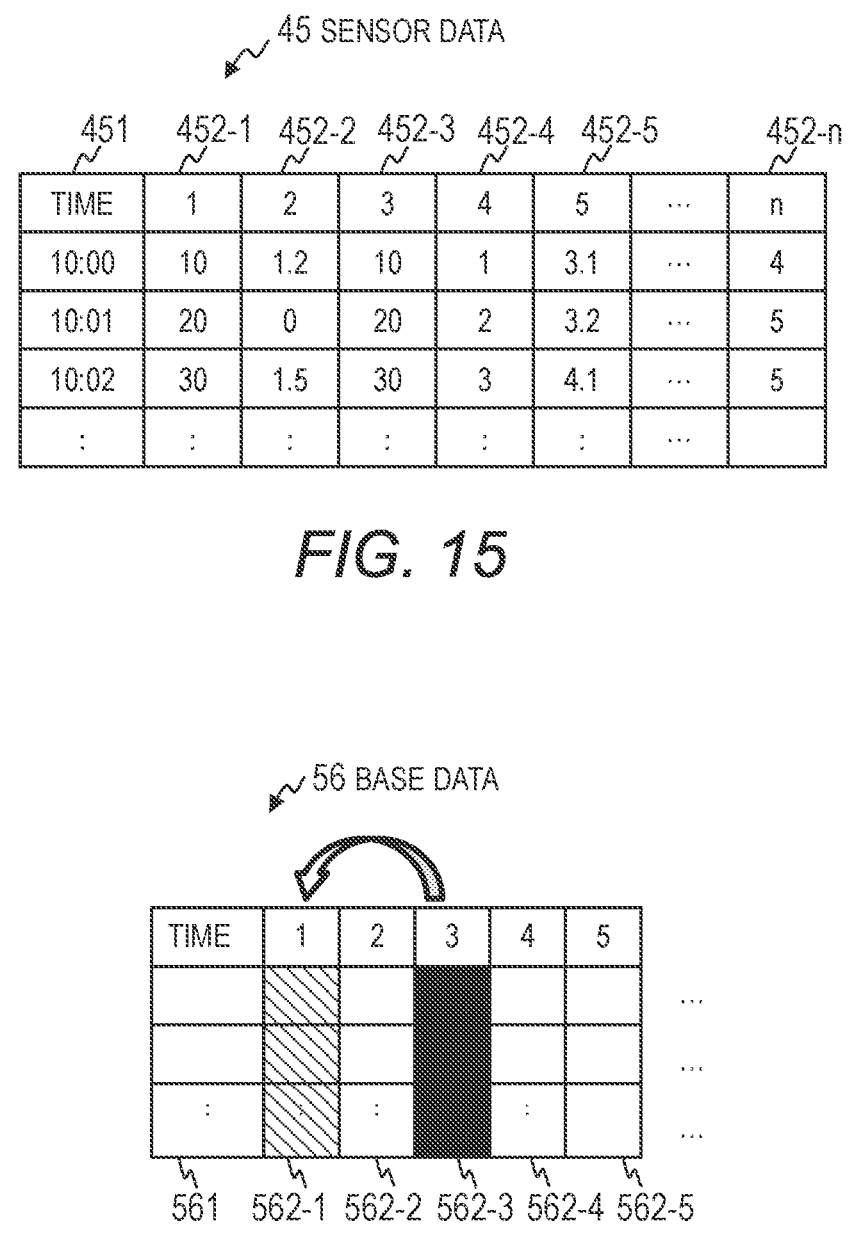

45 SENSOR DATA

| TIME | 1 | 2 | 3 | 4 | 5 | ... | n |
|------|---|---|---|---|---|-----|---|
| 10:00 | 10 | 1.2 | 10 | 1 | 3.1 | ... | 4 |
| 10:01 | 20 | 0 | 20 | 2 | 3.2 | ... | 5 |
| 10:02 | 30 | 1.5 | 30 | 3 | 4.1 | ... | 5 |
| : | : | : | : | : | : | ... | |

56 BASE DATA

| TIME | 1 | 2 | 3 | 4 | 5 | |
|------|---|---|---|---|---|---|
| | | | | | | ... |
| | | | | | | ... |
| : | | : | | : | | ... |

27 BASE SERVER INFORMATION TABLE

| # | BASE ID | NUMBER OF SENSORS | NUMBER OF LINES OF DATA | DATA SIZE (byte) | NUMBER OF DATA COLUMNS |
|---|---|---|---|---|---|
| 1 | 1 | 2000 | 65534 | 1,234,567,890 | 256 |
| 2 | 2 | 1500 | 60000 | 555,555,555 | 348 |
| : | | : | : | : | : |

*FIG. 22*

DATA PROCESSING METHOD, DISTRIBUTED DATA PROCESSING SYSTEM AND STORAGE MEDIUM

BACKGROUND

The present invention relates to a technology for reducing an amount of data using a distributed data processing system.

In a distributed data processing system that analyzes big data and data acquired from a sensor such as a sensor within the Internet of Things (IoT), data is analyzed at a plurality of bases (factories or company branches) and a central base (for example, a head office).

As a distributed data processing system, there is known, for example, Patent Literature 1. In Patent Literature 1, part of a job owned by a client is distributed to a server. That server then executes the received job part and sends a response to the client. With this configuration, the time required to process an entire job is shortened.

There is also known a technology for compressing data by expressing the data in a graph in order to reduce communication costs between the bases and the central base when a large amount of data is handled (see, for example, Patent Literature 2).

As a method of integrating a large amount of data, there is also known a technology of integrating a plurality of columns that have the same values in table data into one column.

CITED DOCUMENT LIST

Patent Literature

[Patent Literature 1] WO 2007/070491A
[Patent Literature 2] WO 2015/114830A

SUMMARY

When handling IoT or big data, a large amount of data is distributed to each base, and hence collecting the data at bases to the central base without altering the data causes communication and storage costs to increase. In this case, statistical analysis is performed on a base-to-base basis after integrating the data at each base to reduce the amount of data, and the data held at the bases is subject to statistical processing according to the statistical analysis performed on a base-to-base basis.

If applying this conventional example of integrating columns as the above-described statistical processing to reduce the amount of data, the columns to be excluded at each base may be different in order to determine the columns to be integrated at each base. When the data statistically processed at the bases is collected at the central base and the data at each base in joined, data excluded at a first base may be used at a second base. This means that the same type of data is repeatedly joined. As a result, in the conventional example, a reduction in communication costs and calculation costs cannot be promoted without the amount of data being smoothly reduced.

The present invention has been made in light of the above-described problem and it is an object of the present invention to optimize data to be integrated at each base to reduce an amount of data when, among data collected by a central base, the same types of data are repeated.

A representative aspect of the present disclosure is as follows. A data processing method for a distribution data processing system in which a central server that has a processor and a memory processes data collected from a base server that has a processor and a memory, the data processing method comprising: a first step in which the base server generates base data using node-cut processing after collecting and standardizing the data, a second step in which the central server collects attribute information on columns of the base data from a plurality of the base servers and a relationship between an integration source and an integration destination of the base data using the node-cut processing of the base server as base column integration information, a third step in which, when a plurality of the base data is integrated on the basis of the attribute information on the columns and the base column integration information, the central server performs replacement calculation of replacing the integration source with the integration destination and calculating a combination of the integration source and the integration destination with which an amount of data can be reduced, and a fourth step in which, when a result of the replacement calculation indicates that there is a combination of the integration source and the integration destination with which the amount of data can be reduced, the central server notifies the base server of the combination as a replacement instruction.

According to the present invention, statistical processing at each base can be optimized and the amount of data collected by a central server can be reduced by extracting data that can be reduced (integrated) and notifying each base of the data as a result of the central server joining base data collected from each base server.

BRIEF DESCRIPTION OF THE DRAWINGS

FIG. 8 is a diagram for illustrating an example of the base column information table according to the first embodiment of this invention.

FIG. 9 is a diagram for illustrating an example of the base column integration table according to the first embodiment of this invention.

FIG. 10 is a diagram for illustrating an example the column priority table according to the first embodiment of this invention.

FIG. 11 is a diagram for illustrating an example of the base server information table of the central server according to the first embodiment of this invention.

FIG. 12 is a diagram for illustrating an example of the column attribute information table of the central server according to the first embodiment of this invention.

FIG. 13 is a diagram for illustrating an example of the column integration information table of the central server according to the first embodiment of this invention.

FIG. 14 is a diagram for illustrating an example of the column status table of the central server according to the first embodiment of this invention.

FIG. 15 is a diagram for illustrating an example of the sensor data according to the first embodiment of this invention.

FIG. 16 is a diagram for illustrating an example of the base data according to the first embodiment of this invention.

FIG. 22 is a diagram for illustrating an example of the base server information table according to the second embodiment of this invention.

DETAILED DESCRIPTION OF THE PREFERRED EMBODIMENTS

Embodiments of the present invention are described with reference to the attached drawings.

Embodiment 1

Figure 1:
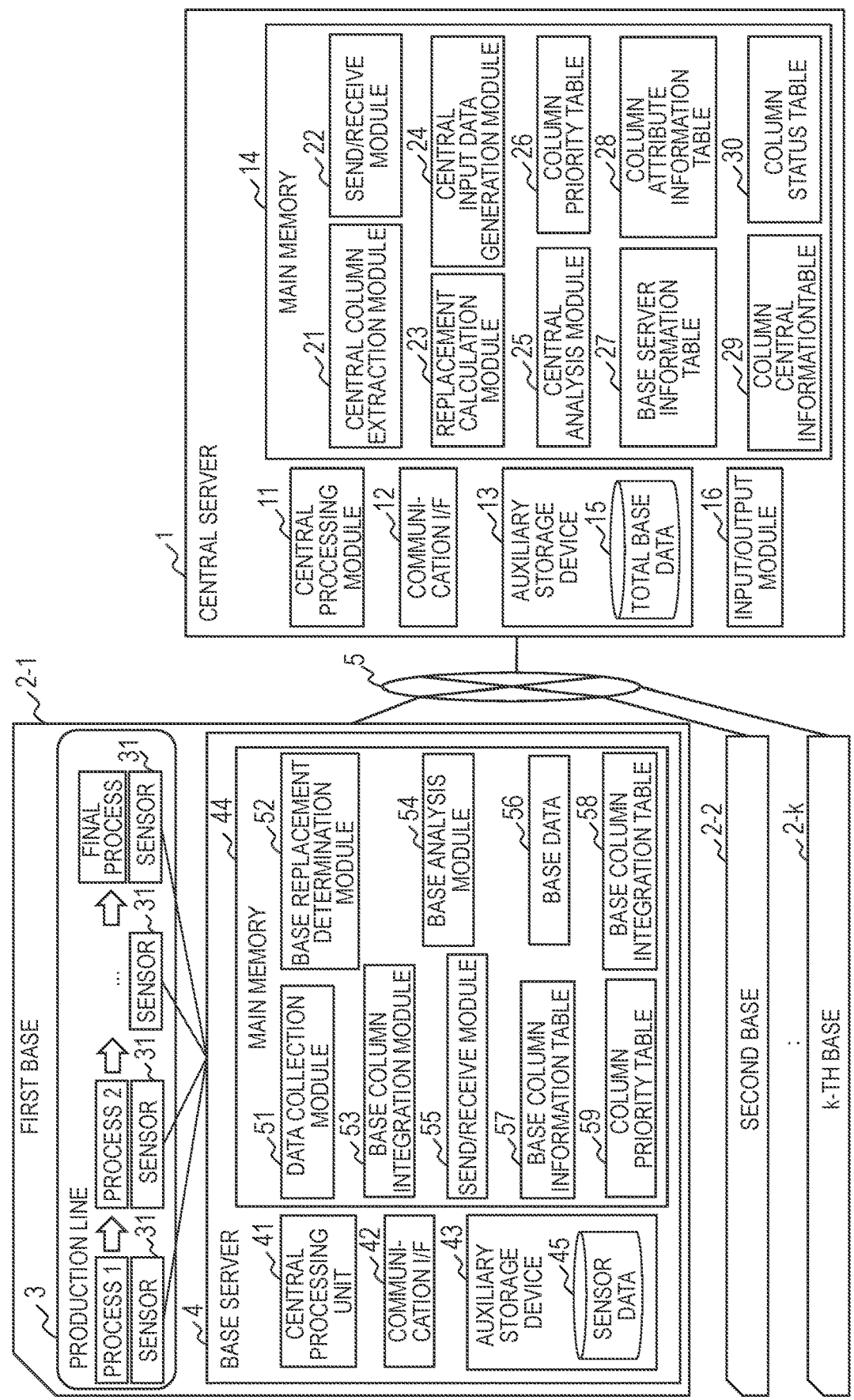
FIG. 1 is a block diagram for illustrating an exemplary distributed data processing system according to a first embodiment of this invention.

FIG. 1 is a block diagram for illustrating an exemplary distributed data processing system according to Embodiment 1 of the present invention. The distributed data processing system includes bases 2-1 to 2-$k$ at which sensor data is collected from a production line 3 and analyzed by a base server 4, and a central server 1 at which the data at each of the bases 2-1 to 2-$k$ is collected via a network 5 and analyzed. Note that the number "2" without the symbol "-" and subsequent numbers is used when referring to bases as a whole. The same applies to the reference symbols of other components. In addition, the base of the central server 1 is referred to as "central base".

<Configuration of Base>

A configuration of the base 2 is now described. Note that a base 2-1 (first base) and bases 2-2 (second base) to 2-$k$ (k-th base) all have the same configuration, and hence overlapping descriptions are omitted.

The base 2 includes the production line 3 provided with a sensor 31 at each process and base server 4 at which sensor data measured by the sensors 31 is collected and analyzed. The base server 4 is a computer that includes a central processing unit 41 that executes arithmetic processing, a communication interface 42 that enables communication between the sensor 31 and the central server 1, an auxiliary storage device 43 configured to store data and programs and a main memory 44 configured to hold data and programs.

The base server 4 collect sensor data 45 from the sensors 31 on the production line 3 and store the sensor data 45 in the auxiliary storage device 43. The base server 4 generates base data 56 by applying the column integration described in the conventional example above to the sensor data 45 to reduce the amount of data. Then, the base server 4 perform preset analytical processing and statistical processing on the base 2 using the base data 56.

The analytical processing performed at each base server 4 is performed in order to extract individual problems or the like at each base 2. Therefore, in integration processing of columns performed in order to reduce the amount of data, the columns of the sensor data 45 which are to be integrated at each base 2 may differ from each other. Because of this, as described later, the base server 4 of each base 2 receives a replacement instruction from the central server 1 as a central base and optimizes the columns to be integrated. Note that in Embodiment 1, an example is described in which the central server 1 transmits an updated column priority table 59 as the replacement instruction.

The base server 4 loads a data collection module 51, a base replacement determination module 52, a base column integration module 53, a base analysis module 54 and a send/receive module 55 as programs to the main memory 44 and runs these programs using the central processing unit 41. In addition, a base data 56, a base column information table 57, a base column integration table 58 and the column priority table 59 are stored in the main memory 44 as data used by each program.

The central processing unit 41 operates as functional modules that provide predetermined functions by performing processing in accordance with programs for the functional modules. For example, the central processing unit 41 functions as the data collecting module 51 by performing processing in accordance with a data collection program. The same applies to other programs. The central processing unit 41 also operates as functional modules that each provide the various functions of a plurality of types of processing performed by each program. The computer and the computer system are a device and a system that include each of these functional modules, respectively.

Information on the programs, tables, etc. that execute each of the functions of the base server 4 can be stored in a storage device such as the auxiliary storage device 43, a nonvolatile semiconductor memory, a hard disk drive or a solid state drive (SSD), or a non-transitory data storage medium that can be read by a computer, such as an IC card, an SD card or a DVD.

The data collection module 51 collects the sensor data 45 from the sensors 31 on the production line 3. The base replacement determination module 52 determines whether specified columns of the sensor data 45 can be integrated on the basis of a replacement instruction from the central server 1. If the columns of the sensor data 45 can be integrated, the base replacement determination module 52 changes the columns to be integrated. Similar to the conventional example, the base column integration module 53 excludes columns that have the same values from the sensor data 45 to generate the base data 56 that has a reduced data amount on the basis of a determination result of the base replacement determination module 52.

The base analysis module 54 performs the analytical processing and statistical processing determined at each base 2 on the generated base data 56 and outputs a processing result. The send/receive module 55 communicates with the central server 1 or the sensors 31.

The sensor data 45, the base data 56, the base column information table 57, the base column integration table 58 and the column priority table 59 are described later.

<Configuration of Central Base>

The central server 1 that functions as a central base is a computer that includes the central processing unit 11 that performs arithmetic processing, the communication interface 12 that communicates with the base server 4 of each base 2, the auxiliary storage device 13 that stores data and programs, the main memory 14 that holds data and programs, and an input/output device 16 that, for example, displays analysis results. The central server 1 collects the base data 56 generated at each base 2 and performs preset analytical processing for the central base.

First, the central server 1 optimizes the columns to be integrated in the base data 56 acquired from the base server 4 and sends a replacement instruction to each base server 4. After the central server 1 has optimized the columns to be integrated, the central server 1 collects the base data 56 from each base server 4 and stores the base data 56 in the auxiliary storage device 13. The central server 1 then generates a total base data 15 by joining the base data 56 at each base 2 and performs predetermined analytical processing and statistical processing on the total base data 15. The analytical processing performed by the central server 1 is performed in order to extract problems or the like from all of the bases 2.

When the central server 1 has assumed that the base data 56 has been collected and joined from the base server 4 of each base 2-1 to 2-k, the central server 1 determines whether or not data can be further reduced by performing integrating processing on the base server 4 side. When the central server 1 joins the base data 56 to generate the total base data 15, the central server 1 notifies the base server 4 if there is a combination of columns for which data can be further reduced and optimizes the base data 56. This processing is optimization of the columns to be integrated. Through iterating this processing, the amount of data is sequentially reduced when the central server 1 acquires the base data 56 from the bases 2. With this configuration, the total base data 15 generated after joining the base data 56 collected from the base server 4 of each base 2 is generated after optimization, and hence the amount of the total base data 15 used in the analytical processing performed by the central server 1 can be reduced.

The central server 1 loads an integrated column extraction module 21, a send/receive module 22, a replacement calculation module 23, a central input data generation module 24 and a central analysis module 25 as programs to the main memory 14 and runs these programs using the central processing unit 11. In addition, a column priority table 26, a base server information table 27, a column attribute information table 28, a column integration information table 29 and a column status table 30 are held in the main memory 14 as data used by each program.

The joined total base data 15 can also be stored in the auxiliary storage device 13. The input/output module 16 includes input devices such as a keyboard, a mouse and a touch panel and an output device such as a display.

The central processing unit 11 operates as functional modules that provide predetermined functions by performing processing in accordance with programs for the functional modules. For example, the central processing unit 11 functions as the integrated column extraction module 21 by performing processing in accordance with an integrated column extraction program. The same applies to other programs. The central processing unit 11 also operates as functional modules that provide the various functions of a plurality of types of processing performed by each program. The computer and the computer system are a device and a system that include each of these functional modules, respectively.

Information on the programs, tables, etc. that execute each of the functions of the central server 1 can be stored in a storage device such as the auxiliary storage device 13, a nonvolatile semiconductor memory, a hard disk drive or a solid state drive (SSD), or a non-transitory data storage medium that can be read by a computer, such as an IC card, an SD card or a DVD.

Before the central server 1 performs the analytical processing, the central server 1 receives attribute information or the like indicating, for example, the status of the base data 56 from the base server 4 of each base 2. The integrated column extraction module 21 generates the column attribute information table 28, the column integration information table 29 and the column status table 30 on the basis of the information received from the base server 4.

The replacement calculation module 23 refers to the column attribute information table 28, the column integration information table 29 and the column status table 30 of each base 2 to determine whether or not there are columns that can be further integrated when the base data 56 is joined. If there are columns that can be integrated, the replacement calculation module 23 generates a replacement instruction. The send/receive module 22 sends the replacement instruction to the relevant base server(s) 4. Note that, in Embodiment 1, there is described an example in which the replacement calculation module 23 updates the column priority table 59 for the target base 2 and the updated column priority table 59 is sent to the base server 4 as the replacement instruction.

The central input data generation module 24 acquires the base data 56 from each base 2 and attribute information or the like on the base data 56 and generates the total base data 15 by joining each of the base data 56. The central analysis module 25 performs predetermined analytical processing set at the central base on the generated total base data 15 and outputs a processing result.

The total base data 15, the column priority table 26, the base server information table 27, the column attribute information table 28, the column integration information table 29 and the column status table 30 are described later.

<Tables>

First, tables managed by the base server 4 are described. The sensor data 45, the base data 56, the base column information table 57, the base column integration table 58 and the column priority table 59 are generated at the base server 4.

FIG. 15 is a diagram for illustrating an example of the sensor data 45. FIG. 15 illustrates an example in which the sensor data 45 collected by the base server 4 from the sensors 31 on the production line 3 includes, in one entry, a time 451 and data 452-1 to 452-n that stores values measured for each column identifier. In the example in FIG. 15, the column identifiers are represented by 1 to n.

The time 451 stores a time stamp, which is a time at which the sensor data 45 is measured. The data 452-1 to 452-n of each base 2-1 to 2-k is the sensor data 45 measured by the sensor 31.

FIG. 16 is a diagram for illustrating an example of the base data 56. The base data 56 is a table in which columns of the sensor data 45 with the same (or similar) value are integrated into one column by the base column integration module 53.

The base data 56 includes, in one entry, a time 551 and data 562-1 to 562-n that stores the sensor data 45 for each column identifier. In the example in FIG. 16, the data 562-1 and 562-3 are determined to have the same (or similar) value, and hence the data 562-3 column is excluded (black portion in FIG. 16) and integrated into the data 562-1 column (hatched portion in FIG. 16). In other words, FIG. 16 illustrates an integration destination in which values are used in the hatched field and an integration source in which values are not used in the black field.

The base column integration module 53 of the base server 4 extracts columns that have the same value or similar values on a column-to-column basis and integrates those columns into one column. Note that the columns to be integrated are selected on a predetermined condition such as information in the column priority table 59 that is described later or a round robin format. Note that similarity between column values can be determined as similarity between columns in which the values of the sensor data 45 are in a proportional relationship, for example, the columns have a similar relationship because the values of the data 452-1 and the data 452-4 are proportional.

FIG. 8 is a diagram for illustrating an example of the base column information table 57. The base column information table 57 is a table set at each base 2 for identifying the value content or attribute of each column of the sensor data 45 and the base data 56.

The base column information table 57 includes, in one entry, a column ID 571 that stores an identifier of the column, a column name 572 that stores the name of the sensor data 45 measured by the sensor 31, and a column attribute 573 that stores attribute information on the value of the sensor data 45.

The column ID 571 is a column identifier corresponding to the data 562-1 to 562-n of the base data 56. In Embodiment 1, the column identifier is a unique value in the base 2 and uses an identifier from 1 to n.

FIG. 9 is a diagram for illustrating an example of the base column integration table 58. The base column integration table 58 is a table that shows the relationship between columns excluded from the base data 56 and columns at the integration destination. The base column integration table 58 includes, in one entry, a serial number 581, an integration destination 582 that stores the name of the column at the integration destination, an integration source 583 that stores the name of a column excluded from the base data 56, and a number of matching rows 584 that stores a number of rows that have matching (or similar) data.

In the example of FIG. 9, the column name indicates that the columns "temperature of device 1" and "sensitivity of device 1" have been integrated into the column "outside temperature". In other words, the column name indicates that data corresponding to "temperature of device 1" and "sensitivity of device 1" is excluded from the base data 56 and integrated into the column "outside temperature."

Note that, in Embodiment 1, there is described an example in which the number of rows having matching (or similar) values in the base data 56 is stored in the number of matching rows 584, but number of matching rows 584 may store a ratio of the number of all rows to the number of rows with matching values.

FIG. 10 is a diagram for illustrating an example the column priority table 59. The column priority table 59 is a table generated by the central server 1 and is set with one column to be the integration destination and one column to be excluded.

The column priority table 59 includes, in one entry, a serial number 591, a prioritized column ID 592 that stores the identifier of a column to be prioritized as the integration destination and a non-prioritized column ID 593 that stores the identifier of a column to be excluded as the integration source.

Note that the column priority table 26 of the central server 1 is the same as that illustrated in FIG. 10 and includes the serial number 591, the prioritized column ID 592 and the non-prioritized column ID 593 in one entry. The column priority table 26 of the central server 1 is preset as column priority in system settings on the basis of knowhow or the like on the central server 1.

FIG. 11 is a diagram for illustrating an example of the base server information table 27 of the central server 1. The base server information table 27 is updated when the central server 1 receives various types of information from the bases 2.

The base server information table 27 includes, in one entry, a serial number 271, a base ID 272 that stores an identifier of the base 2, a sensor number 273 that stores the number of sensors 31 managed by the base 2, a number of data rows 274 that stores the number of rows of the base data 56 and a data size 275 that stores the size of the base data 56.

FIG. 12 is a diagram for illustrating an example of the column attribute information table 28 of the central server 1. Note that the central server 1 can generate a column attribute information table 28 for each base server 4. The column attribute information table 28 is a table set with attributes and the like of the data 562-1 to 562-n of the base data 56 received by the central server 1 from the base server 4 of each base 2.

The column attribute information table 28 includes, in one entry, a column ID 281 that stores the base data 56 and identifiers of columns in the total base data 15, a column name 282 that stores the name of the base data 56 in each column and a column attribute 283 that stores the attribute of the base data 56.

A value from 1 to n corresponding to the data 562-1 to 562-$n$ of the base data 56 is set as the column ID 281.

In other words, in the column ID 281="1", "outdoor temperature" is stored as name=column name 282 for the sensor data 45 and data on "temperature" is stored as attribute=column attribute 283 for the sensor data 45.

FIG. 13 is a diagram for illustrating an example of the column integration information table 29 of the central server 1. The column integration information table 29 is generated when the central server 1 receives the base column integration table 58 or the like from each base 2. Note that the central server 1 can generate one column integration information table 29 for each base server 4.

The column integration information table 29 includes, in one column, a column ID 291 that stores identifiers of columns in the base data 56, an integrated rate 292 that stores a ratio of rows that have matching values in the columns of each base data 56, a base ID=1 integration information 293 that indicates the integration destination of a base ID=1 (base 2-1) and a base ID=2 integration information 294 that indicates the integration destination of a base ID=2 (base 2-2). Note that, while not shown in the drawings, the column integration information table 29 includes rows until a base ID=k (base 2-$k$).

The integrated rate 292 stores a ratio of number of rows that match the value of a column at the integration source to the number of rows of each column (1~n) ID 291. A column ID 291 with an integrated rate 292 of 0% indicates that the column has not been integrated into another column. A column ID 291=3 with an integrated rate 292 of 100% indicates that the column has been integrated into another column (column ID 291=1).

In the base ID=1 integrated information 293 and the base ID=2 integrated information 294, a column ID 291 of "none" indicates that the column has not been integrated into another column and a column ID 291="3" of "1" indicates the column ID at the integration destination.

FIG. 14 is a diagram for illustrating an example of the column status table 30 of the central server 1. Note that the central server 1 can generate one column status table 30 for each base server 4.

The column status table 30 stores a match rate between the value of each column in the base data 56 and the values of other columns. The column status table 30 includes, in one entry, a column ID 301 that stores a column ID to be compared and column IDs 302 to 306. Note that, in the example illustrated in FIG. 14, the column IDs 302 to 306 indicate that the column ID=1 to 4 and n.

A column ID 301 of "comparison column ID=3" and a column ID 302 of "1" indicate a "100% match" and that base data 56 with the column ID=3 and the column ID=1 match across all the bases 2.

A column ID 301 of "comparison column ID=4" and a column ID 304 of "3" indicate a "90% match" and that base data 56 with the column ID=3 and the column ID=4 match 90%.

Figure 17:
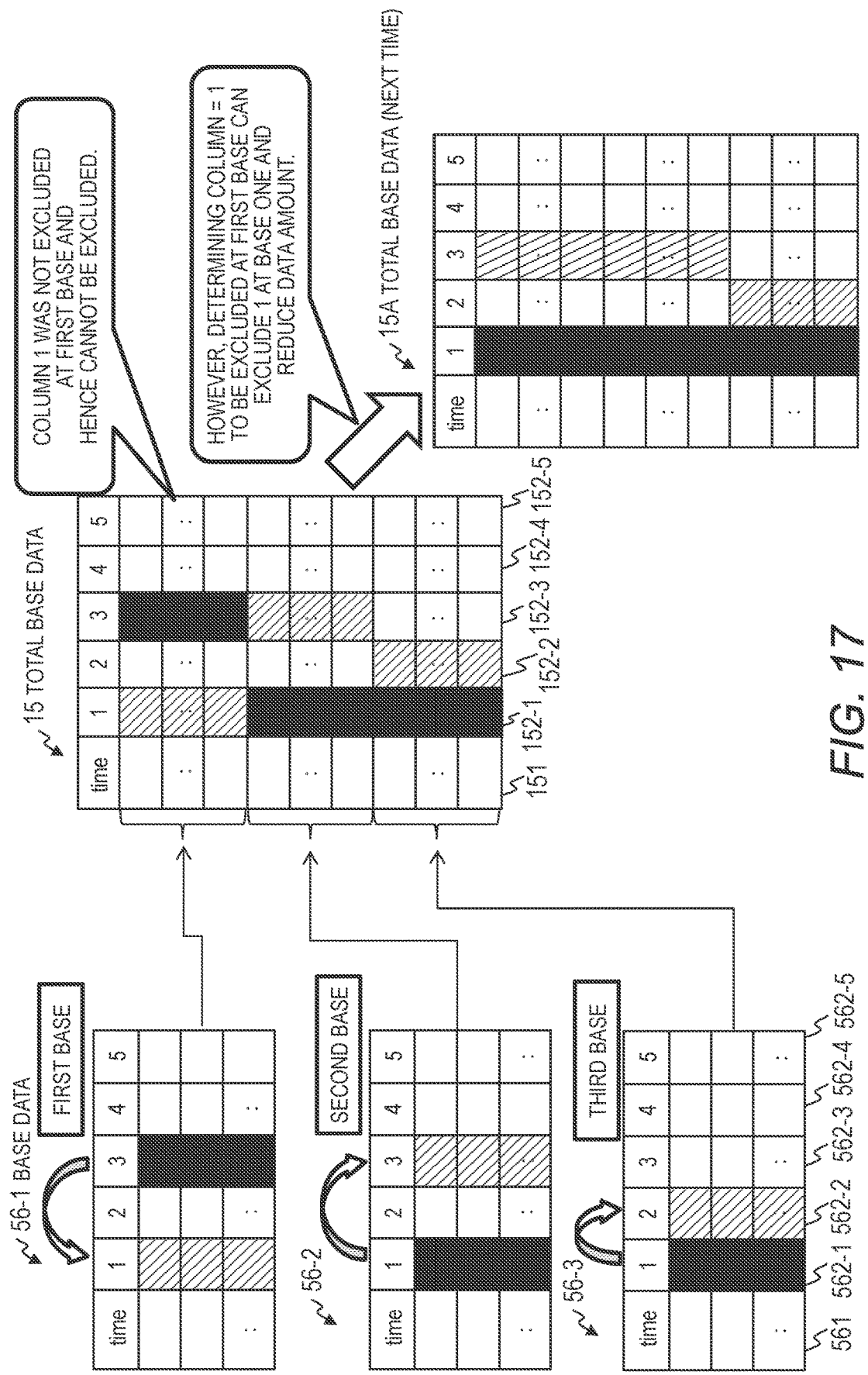
FIG. 17 is a diagram for illustrating the relationship between the total base data and the base data in the central server according to the first embodiment of this invention.

FIG. 17 is a diagram for illustrating the relationship between the total base data 15 and the base data 56 in the central server 1.

The total base data 15 is a table in which the base data 56 collected from the base server 4 of each base 2 is joined.

The total base data 15 includes a time 151 that stores a time stamp and data 151-1 to 151-5 that store the base data 56 with column identifiers (hereinafter, column ID) of 1 to 5. Note that, in the example illustrated in FIG. 17, the column IDs are from 1 to 5, but the total base data 15 actually includes standardized base data 56 with column IDs of 1 to n.

The total base data 15 illustrated in FIG. 17 illustrates a case in which a base data 56-1 of the base 2-1 (first base), a base data 56-2 of the base 2-2 (second base) and a base data 56-3 of the base 2-3 (third base) are joined for each identical column ID. Similar to FIG. 16, in FIG. 17, the hatched field indicates the integration destination at which values are used and the blacked-out field indicates the integration source at which values are not used.

In the example illustrated in FIG. 17, for the base data 56-1 of the first base, the column ID=3 is integrated into the column ID=1, for the base data 56-2 of the second base, the column ID=1 is integrated into the column ID=3, and for the base data 56-3 of the third base, the column ID=1 is integrated into the column ID=2.

At the central server 1, when it is assumed that the base data 56 has been joined, the column ID=1 is excluded from the base data 56-2 of the second base and the base data 56-3 of the third base and integrated into another column. In contrast, the column ID=1 is not excluded from the base data 56-1 of the first base and is set as the integration destination.

On the other hand, if the column ID=1 is integrated into the column ID=3 in the base data 56-1 of the first base, as in the case of the illustrated total base data 15A, data with the column ID=1 becomes unnecessary and the base server 4 of each base 2 needs only send data with the column ID=2 and the column ID=3 to the central server 1. As a result, the amount of data transferred between the base server 4 and the central server 1 can be reduced.

In light of this, the central server 1 according to Embodiment 1 instructs replacement of the column IDs to be integrated at the base server 4 of the first base. In other words, the central server 1 instructs the base server 4 of the first base to integrate the column ID=1 into the column ID=3. The base server 4 of the first base replaces the column ID=1 of the integration destination with the column ID=3 for the base data 56-1 to be generated next and integrates the data in the column direction.

<Outline of System>

Figure 18:
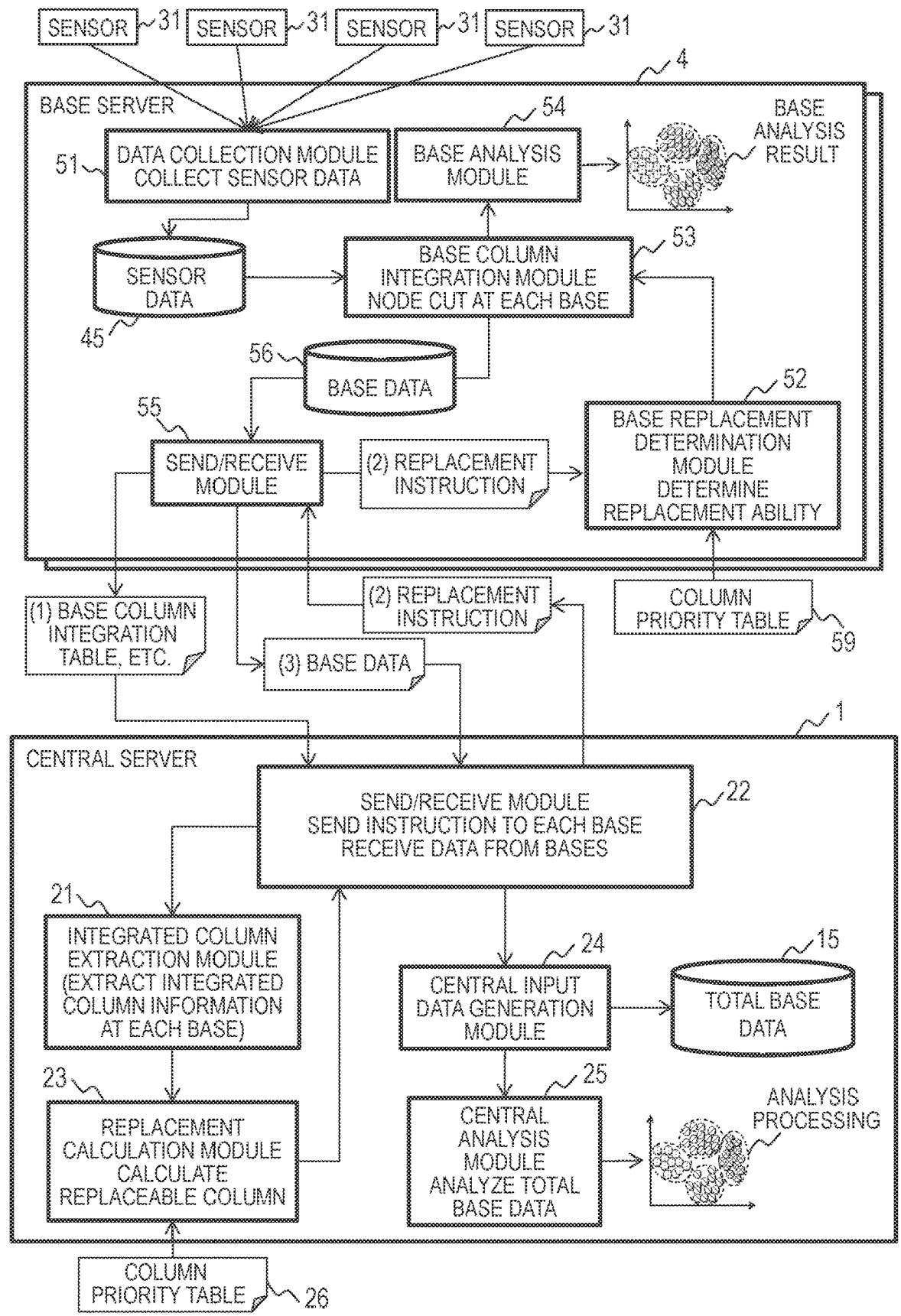
FIG. 18 is a block diagram for illustrating exemplary components of a distribution data processing system according to the first embodiment of this invention.

FIG. 18 is a block diagram for illustrating exemplary components of a distribution data processing system. The base server 4 collects the sensor data 45 from the sensors 31 on the production line 3. Then, when the base server 4 performs analysis according to an instruction from a manager or the like, the base column integration module 53 first excludes identical or similar columns from the sensor data 45 to be analyzed to generate base data 56 having a reduced data amount.

The base analysis module 54 performs predetermined analytical processing on the generated base data 56 and outputs an analysis result. Note that the analytical processing is performed at a predetermined timing such as every week or every month determined by, for example, a manager of the base 2.

The send/receive module 55 sends, for example, information on the integrated columns and the base data 56 to the central server 1.

The central server 1 optimizes the columns to be integrated before collecting the base data 56 from the base server 4 of each base 2. When optimization is complete, the central server 1 acquires the base data 56 from each base server 4, joins the base data 56 to generate the total base data 15, and performs predetermined analytical processing at the central base. Note that the analytical processing is performed at a predetermined timing such as every week or every month determined by, for example, a manager of the central base.

The integrated column extraction module 21 of the central server 1 acquires information (base column integration table 58, base column information table 57) on the integrated columns from each base server 4 ((1) in FIG. 18). The replacement calculation module 23 calculates a replaceable column ID from the extracted column IDs and the column priority table 26. If there is a combination of column IDs for which the amount of data can be reduced when the base data 56 is joined, the replacement calculation module 23 sends a replacement instruction from the send/receive module 22 to the base server 4 (2). Note that the column priority table 59 for each base 2 that includes a plurality of column ID combinations can be used as the replacement instruction.

At the base server 4 that has received the replacement instruction, the base replacement determination module 52 refers to the replacement instruction (column priority table 59) to determine whether the column IDs to be integrated can be replaced. If replacement is possible, the base replacement determination module 52 notifies the base column integration module 53 of the column IDs for which the integration destination is to be replaced. The base column integration module 53 reflects the replacement instruction when updating the column priority table 59 and generating the next base data 56. If the amount of data in the central server 1 can be reduced, the base column integration module 53 iterates processing of optimizing the above-described columns to be integrated.

When the optimization processing is complete at the central server 1, the central input data generation module 24 acquires the base data 56 from each base server 4 (3) and joins the base data 56 to generate the total base data 15. Then, the central analysis module 25 uses the total base data 15 to perform predetermined analytical processing preset at the central base.

As described above, in the distribution data processing system of Embodiment 1, the central server 1 of the central base optimizes the columns to be integrated at each base server 4 before performing the analytical processing to calculate a combination of column IDs that can be replaced and reduce the amount of data. The central server 1 notifies the base server 4 of the combination of column IDs with which the data amount can be reduced and changes the column IDs to be integrated when generating the next base data 56.

By iterating the above-described processing, the amount of the base data 56 that is collected when the central server 1 performs the analytical processing can be gradually reduced. Note that, in Embodiment 1, there is described an example in which the central server 1 collects the data to be processed (base data 56) from each base server 4 after optimizing the columns to be integrated on the basis of the base column integration table 58 or the like, but the present invention is not limited thereto. For example, the central server 1 may be configured to optimize the columns to be integrated after first collecting the base data 56 to be analyzed.

<Details of Processing>

Figure 2:
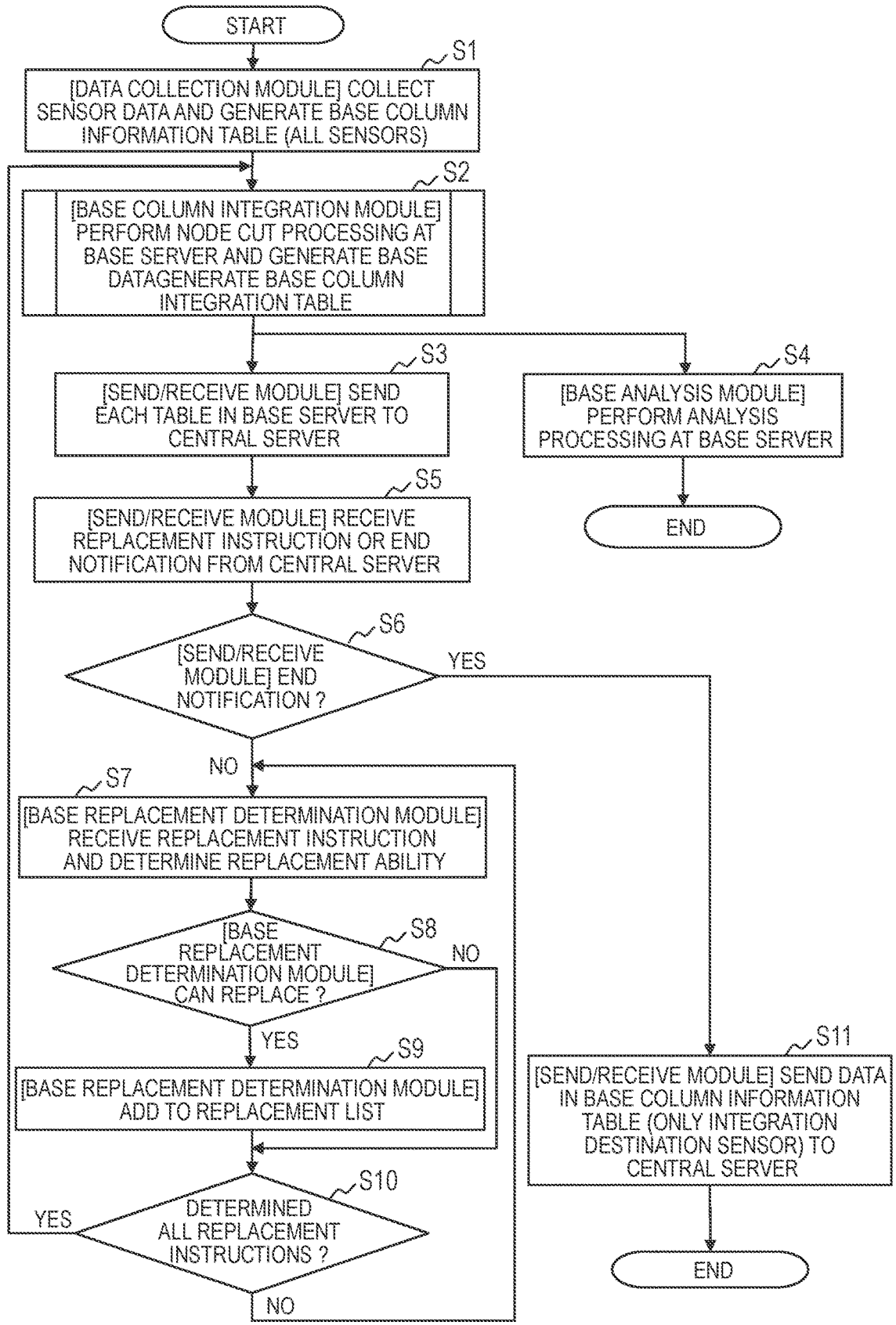
FIG. 2 is a flowchart for illustrating an example of the processing performed at the base server according to the first embodiment of this invention.

FIG. 2 is a flowchart for illustrating an example of the processing performed at the base server 4. This processing starts when the base 2 performs the analytical processing. Note that the sensor data 45 to be analyzed at the base server 4 is designated by an input/output device (not shown).

In Step S1, the data collection module 51 of the base server 4 collects the sensor data 45 from the sensors 31 and generates (or updates) the base column information table 57.

Next, in Step S2, the base column integration module 53 of the base server 4 refers to the column priority table 59 and compares the data of each column in the sensor data 45 to identify combinations of columns with matching values or columns with proportionate values, and then calculates the column IDs to be integrated (excluded). Note that this processing of excluding data on a column-to-column basis to reduce the amount of data is referred to as "node-cut processing". In the node-cut processing according to this embodiment, integration source (excluded) columns are integrated into integration destination (usage data) columns.

As illustrated in FIG. 9, the base column integration module 53 acquires the names of the columns to be integrated from the base column information table 57 to generate the base column integration table 58. The base column integration module 53 generates data from which integration source columns have been deleted from the sensor data 45 as the base data 56.

In Step S4, the base analysis module 54 performs predetermined analytical processing using the base data 56.

In Step S3, the send/receive module 55 sends data in the base column information table 57, data in the base column integration table 58 and the number of rows and data size in the base data 56 to the central server 1. Note that the processing in Steps S3 and S4 can be performed asynchronously. At this time, the base data 56 is not sent.

In Step S5, the send/receive module 55 receives a replacement instruction or a completion notification for the columns from the central server 1. Then, in Step S6, the send/receive module 55 determines whether a completion notification for optimization has been received. If the completion notification has been received, the send/receive module 55 proceeds to Step S11. If the completion notification has not been received, the send/receive module 55 proceeds to Step S7.

In Step S7, the base replacement determination module 52 receives the replacement instruction and refers to the column priority table 59 to determine whether replacement is possible. The base replacement determination module 52 determines that replacement is possible if the integration destination column ID and the integration source column ID included in the replacement instruction do not match the non-prioritized column ID 593 and the prioritized column ID 592 in the column priority table 59. The base replacement determination module 52 determines that replacement is not possible if the integration destination column ID and the integration source column ID match the non-prioritized column ID 593 and the prioritized column ID 592.

In Step S8, the base replacement determination module 52 proceeds to Step S9 if the determination result indicates that replacement is possible and proceeds to Step S10 if the determination result indicates that replacement is not possible. In Step S9, the base replacement determination module 52 stores the integration destination column ID and the integration source column ID specified by the replacement instruction in a replacement list (not shown). Note that the replacement list can store a plurality of combinations of the integration destination column ID and the integration source column ID.

In Step S10, the base replacement determination module 52 determines whether all of the pairs of column IDs in the replacement instruction have been processed. If all the pairs of column IDs have been processed, the base replacement determination module 52 returns to Step S2 and iterates the above-mentioned processing. If all the pairs of column IDs have not been processed, the base replacement determination module 52 returns to Step S7 and iterates the above-mentioned processing.

On the other hand, in Step S11 in which the completion notification is received based on the determination in Step S6, the send/receive module 55 sends the base data 56 as analysis input data and data in the updated base column integration table 58 to the central server 1 and ends the processing.

By performing the above-described processing, the base server 4 generates the base data 56 for which the amount of sensor data 45 has been reduced using the node-cut processing, generates the information (base column integration table 58) with a reduced data amount and the attribute information (base column information table 57) on the base data 56 and then sends this data to the central server 1.

Then, when the base server 4 receives the replacement instruction from the central server 1, if there is a combination of column IDs not specified by the column priority table 59 of the base 2, the combination is added to the replacement list and subject to the next node-cut processing. Note that the base server 4 adds the content of the replacement list to the column priority table 59.

In this way, by optimizing the columns to be integrated, the amount of base data 56 collected from each base 2 can be reduced using the central server 1.

Figure 3:
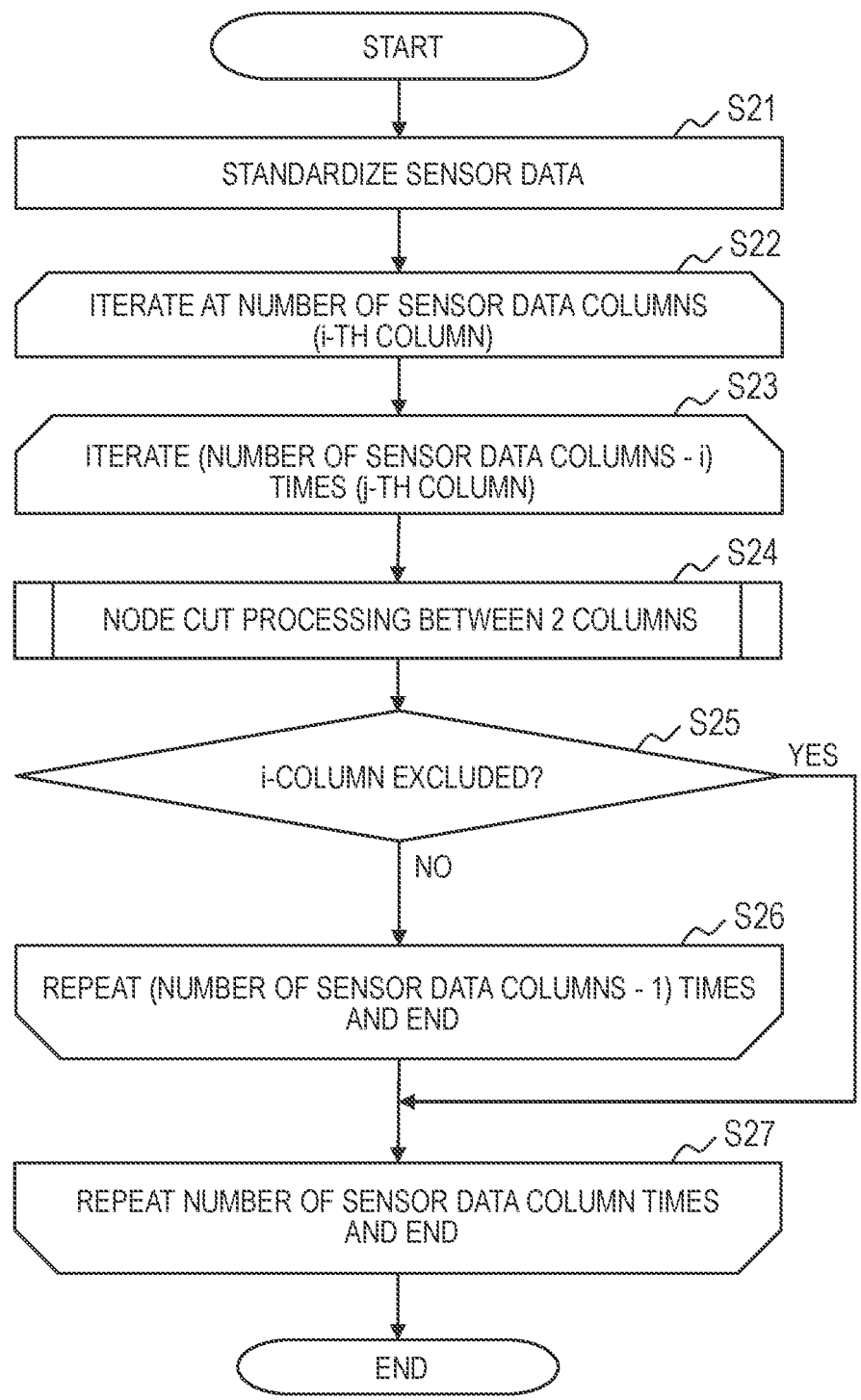
FIG. 3 is a flowchart for illustrating an example of processing performed by the base column integration module of the base server according to the first embodiment of this invention.

FIG. 3 is a flowchart for illustrating an example of processing performed by the base column integration module 53 of the base server 4. This processing is performed in Step S2 of FIG. 2.

First, in Step S21, the base column integration module 53 acquires the sensor data 45 to be analyzed and standardizes the data using a known method such as normal distribution. Next, the base column integration module 53 iterates Steps S22 to S27 according to the number of standardized columns of sensor data 45 and further iterates the processing from Steps S23 to S26 for the number-1 of standardized columns of sensor data 45.

In Step S24, the base column integration module 53 performs the node-cut processing between two columns to be described later and excludes the currently selected sensor data 45 (i-column) on a column-to-column basis. If the i-column can be integrated into a j-column, the base data 56 is generated by excluding the applicable i-column. Note that, in Embodiment 1, there is described an example in which the i-column is excluded, but the j-column may be excluded and an exclusion rule specified by the user can be applied. The exclusion rule specified by the user can be, for example, "exclude columns with a large column number" or "exclude columns with a small data distribution value".

In Step S25, the base column integration module 53 determines whether the i-column sensor data 45 that is currently selected has been excluded. If the i-column sensor data 45 has been excluded, the base column integration module 53 proceeds to Step S27 and to the next column (i+1). If the i-column sensor data 45 has not been excluded, the base column integration module 53 processes the next column (j+1).

Due to the above-described processing, the base column integration module 53 compares data in the i-column and the j-column of the standardized sensor data 45 and, if the data matches, generates the base data 56 by excluding the i-column (or the j-column).

Figure 4:
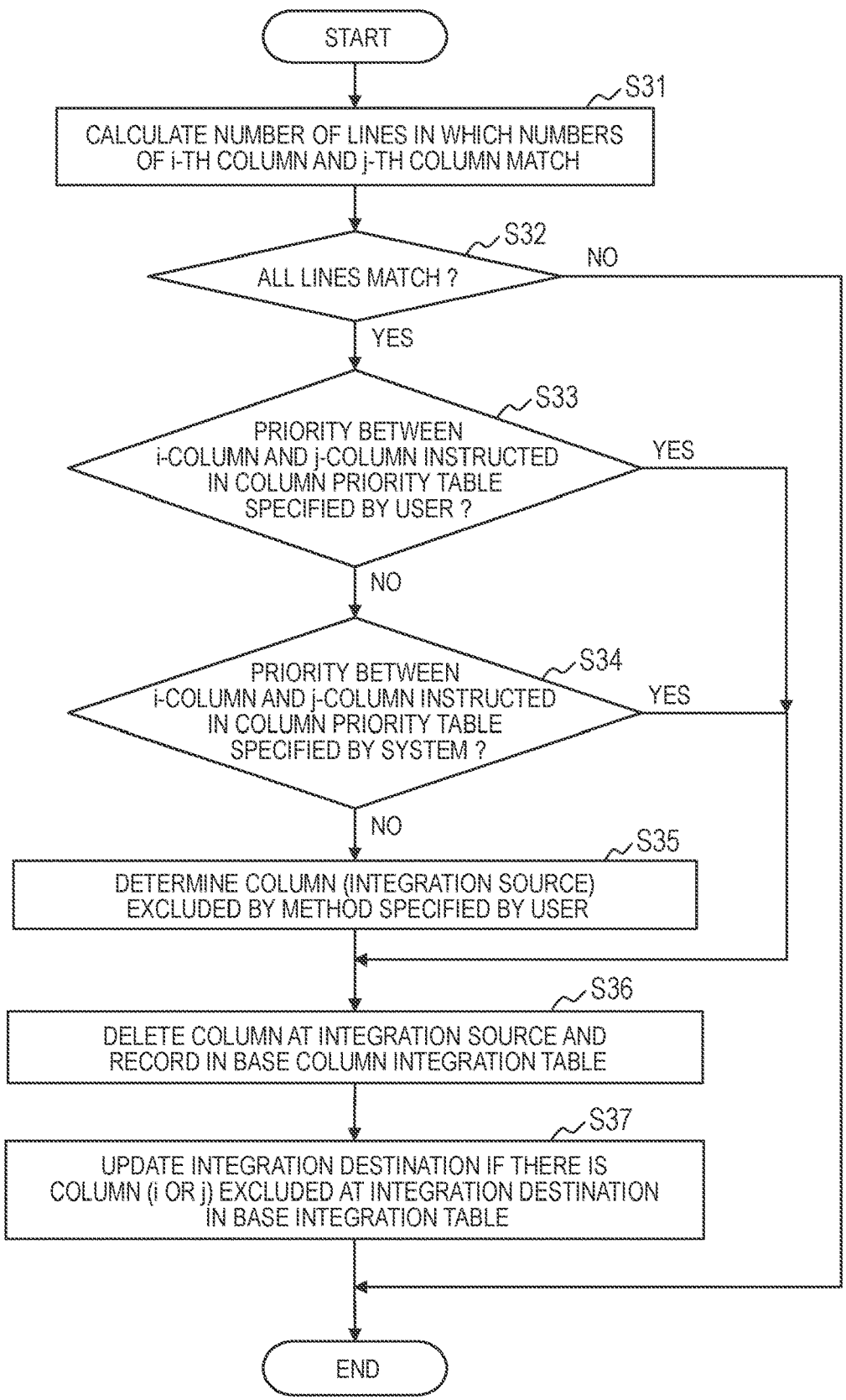
FIG. 4 is a flowchart for illustrating an example of processing performed by the base column integration module of the base server according to the first embodiment of this invention.

FIG. 4 is a flowchart for illustrating an example of processing performed by the base column integration module 53 of the base server 4. This processing is performed in Step S24 of FIG. 3.

First, in Step S31, the base column integration module 53 calculates the number of rows of the i-column and the j-column of the standardized sensor data 45 that have matching values. Next, in Step S32, the base column integration module 53 uses the i-column and the j-column of the standardized sensor data 45 to determine whether all of the rows have matching values. If all the rows have matching values, the base column integration module 53 proceeds to Step S33. If not all the rows have matching values, the base column integration module 53 ends the processing and returns to the above-described processing in FIG. 3.

In Step S33, the base column integration module 53 refers to the column priority table 59 of the base 2 and, if the relationship between the current i-column and j-column is specified by the column priority table 59 on the base 2 side, that specification is selected and the base column integration module 53 proceeds to Step S36. If the relationship is not specified, the base column integration module 53 proceeds to Step S34.

In Step S34, the base column integration module 53 refers to the column priority table 26 of the central server 1 and, if the relationship between the current i-column and j-column is specified by the column priority table 26 of the central server 1, that specification is selected and the base column integration module 53 proceeds to Step S36. If the relationship is not specified, the base column integration module 53 proceeds to Step S35. Note that the column priority table 26 of the central server 1 is a priority table specified by the system.

In Step S35, the base column integration module 53 determines the column (integration source) to be excluded using a method specified by the user (or manager) of the base 2.

In Step S36, the base column integration module 53 deletes the data of the i-column in the standardized sensor data 45 based on the selected specification and generates the base data 56. In other words, the base column integration module 53 integrates the data of the i-column into the j-column. Then, the base column integration module 53 refers to the base column information table 57 to acquire the column name 572 of the i-column at the integration source from the column ID and the column name 572 of the j-column at the integration destination and adds the names to the base column integration table 58. In addition, the base column integration module 53 sets a number of rows with the i-column and the j-column that have matching values in the number of matching rows 584 of the base column integration table 58.

In Step S37, the base column integration module 53 refers to the integration destination in the base column integration table 58 and, if the integration destination includes a column to be excluded, the integration destination of the column to be excluded is changed and the base column integration table 58 is updated.

Due to the above-described processing, if the value of each row in the i-column and the j-column in the standardized sensor data 45 matches, the i-column is integrated into the j-column and base data 56 having a reduced data amount is generated, to thereby generate the base column integration table 58 in which the relationship between the integration source i-column and the integration destination j-column has been added.

Figure 5:
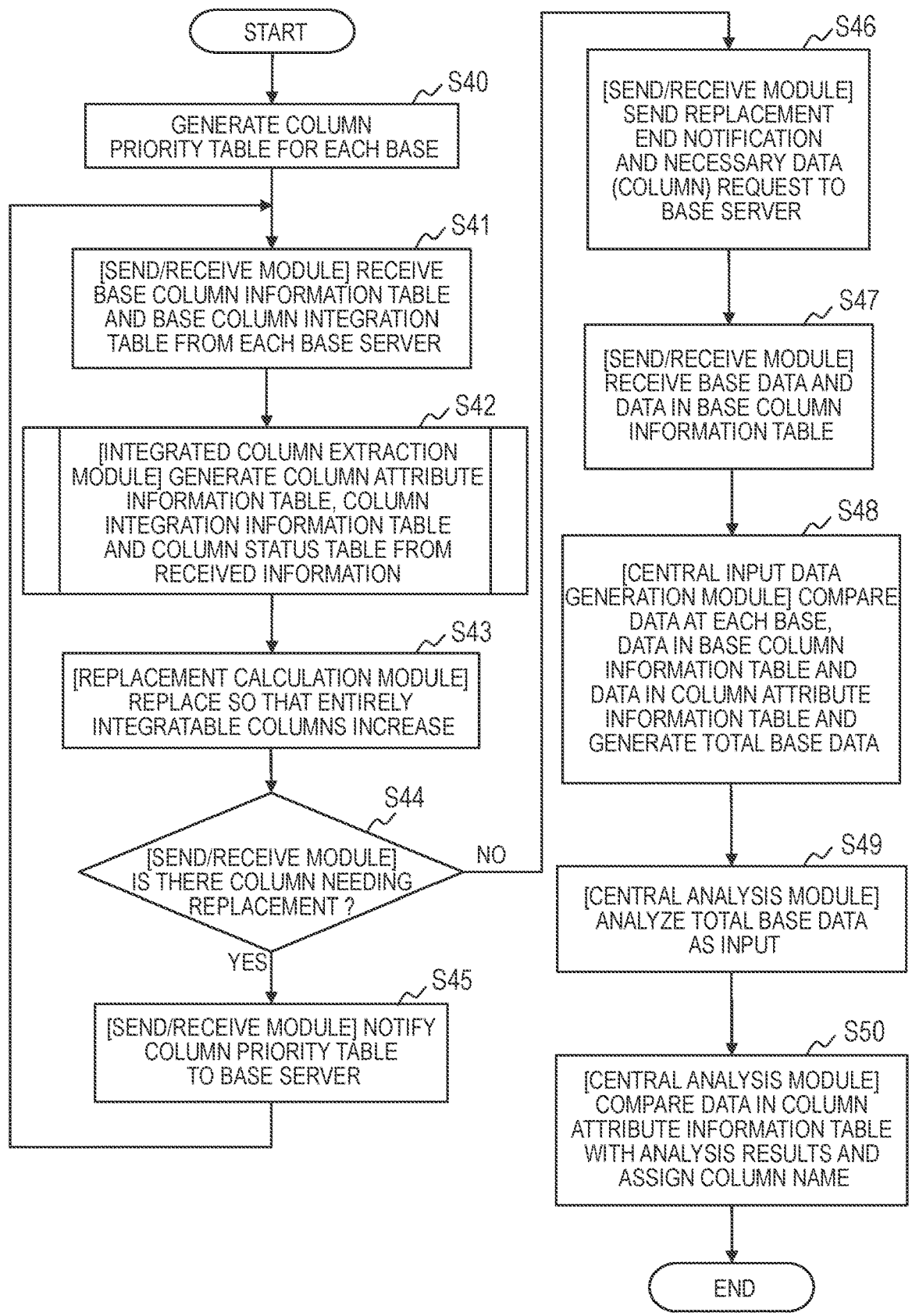
FIG. 5 is a flowchart for illustrating an example of processing performed by the central server according to the first embodiment of this invention.

FIG. 5 is a flowchart for illustrating an example of processing performed by the central server 1. This processing is performed when the central server 1 performs analytical processing.

In Step S40, the integrated column extraction module 21 generates a column priority table 59 for each base 2. In addition, the integrated column extraction module 21 generates the column priority table 26 of the central base. The column priority tables 59 and 26 are tables preset according to know-how or the like on each base 2 and include a column to be the integration destination and a column to be excluded. Note that after the column priority table 59 of each base has been preset, the content of the replacement instruction received from the central server 1 can be provided as feedback.

In Step S41, the send/receive module 22 receives data in the base column information table 57, data in the base column integration table 58 and a number of rows and data size of the base data 56 as information on the columns to be integrated from the base server 4 of each base 2. In Step S42, the send/receive module 22 generates the column attribute information table 28, the column integration information table 29 and the column status table 30 on the basis of information on the columns to be integrated at each base 2 received by the integrated column extraction module 21.

The integrated column extraction module 21 sets the column ID 571, the column name 572 and the column attribute 573 in the base column information table 57 of each base 2 as the column ID 281, the column name 282 and the column attribute 283 in the column attribute information table 28, respectively, and generates the column attribute information table 28.

The integrated column extraction module 21 generates the column integration information table 29 from the integration destination 582, the integration source 583 and the number of matching rows 584 in the base column integration table 58 of each base 2 and the column name 572 and the column ID 571 in the base column information table 57.

The integrated rate 292 of the column integration information table 29 stores a percentage (rate) obtained by the integrated column extraction module 21 dividing the number of matching rows 584 at the integration destination 582 by the total number of rows.

For the base ID=1 integration information 293 and the base ID=2 integration information 294, the integrated column extraction module 21 sets "1" for the column ID 291 at which data exists and "none" for the column ID 291 at which no data exists. Note that, although not shown in the drawings, the base ID=3 integration information to base ID=k integration information corresponding to each column ID=1 to n is included in the column status table 30 for the base IDs=3 to k.

The integrated column extraction module 21 generates the column status table 30 from the integration destination 582, the integration source 583 and the number of matching rows 584 in the base column integration table 58 of each base 2 and the column name 572 and the column ID 571 in the base column information table 57. The column status table 30 stores a rate at which data matches between the column ID and a comparison column ID.

Figure 7:
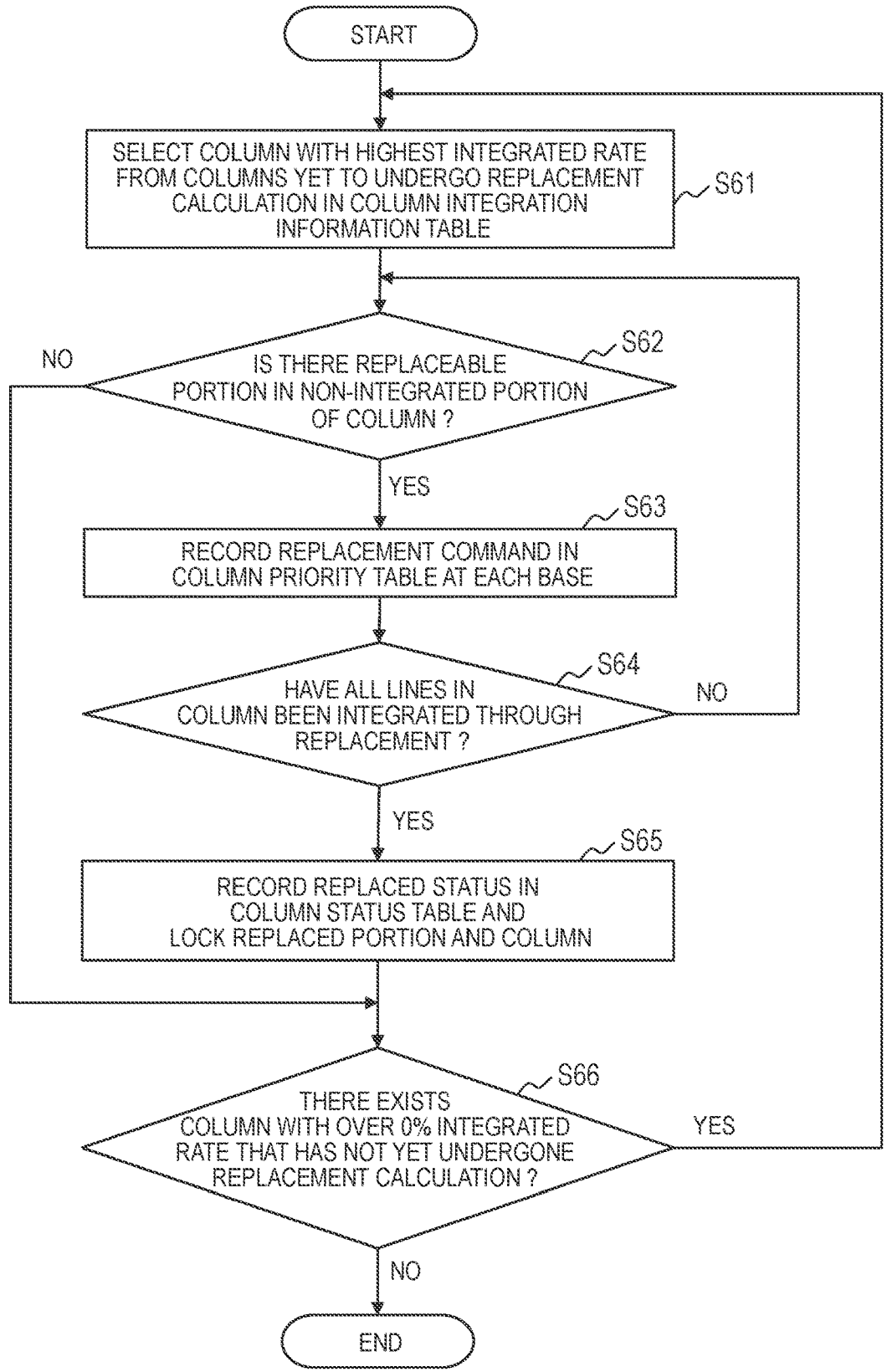
FIG. 7 is a flowchart for illustrating an example of processing performed by the replacement calculation module of the central server according to the first embodiment of this invention.

In Step S43, as illustrated in FIG. 7 to be described later, the replacement calculation module 23 selects a combination that increases the columns that can be integrated in each base data 56. Then, if there is an integration source 583 that be added to the integration destination 582, the send/receive module 22 updates the column priority table 59 of the applicable base 2.

In Step S44, the send/receive module 22 determines whether there is a combination of replaceable columns. If the calculation results of the replacement calculation module 23 indicate that there is a combination of replaceable columns, the send/receive module 22 proceeds to Step S45. If there is no combination of replaceable columns, the send/receive module 22 proceeds to Step S46.

In Step S45, the send/receive module 22 sends the column priority table 59 of each base 2 to the base server 4. With this configuration, the central server 1 can notify the base server 4 that the columns to be integrated will be replaced. After the processing in Step S45, the send/receive module 22 returns to Step S41 and iterates the above-described processing.

On the other hand, in Step S46 in which no replacement is required, the send/receive module 22 sends a completion notification of replacement to each base server 4. The send/receive module 22 also requests the base data 56 necessary for the analytical processing performed by the central server 1 from the base server 4 of the applicable base 2.

In Step S47, the send/receive module 22 receives the requested base data 56 and data in the base column information table 57. In Step S48, the central input data generation module 24 compares the base data 56 of each base 2, the data in the base column information table 57 and the data in the column attribute information table 28 and joins each base data 56 to generate the total base data 15.

Next, in Step S49, the central analysis module 25 performs predetermined analytical processing with the total base data 15 as input. In Step S50, the central analysis module 25 compares the column ID in the analysis results and the column ID 281 in the column attribute information table 28 to acquire the column name 282 in the analysis results and assign the column name 282 to the analysis results.

By performing the above-described processing, the central server 1 calculates a combination of columns with which the number of integratable columns can be increased on the basis of information on the columns to be integrated received from each base server 4. If the number of integratable columns can be increased, the column priority table 59 of each base 2 is updated and the columns to be integrated are replaced. With this processing, the amount of the base data 56 received by the central server 1 can be reduced.

In addition, the central server 1 iterates update of the column priority table 59 of each base 2 until the number of integratable columns cannot be increased any further. With this, the columns to be integrated at each base server 4 can be optimized.

Figure 6:
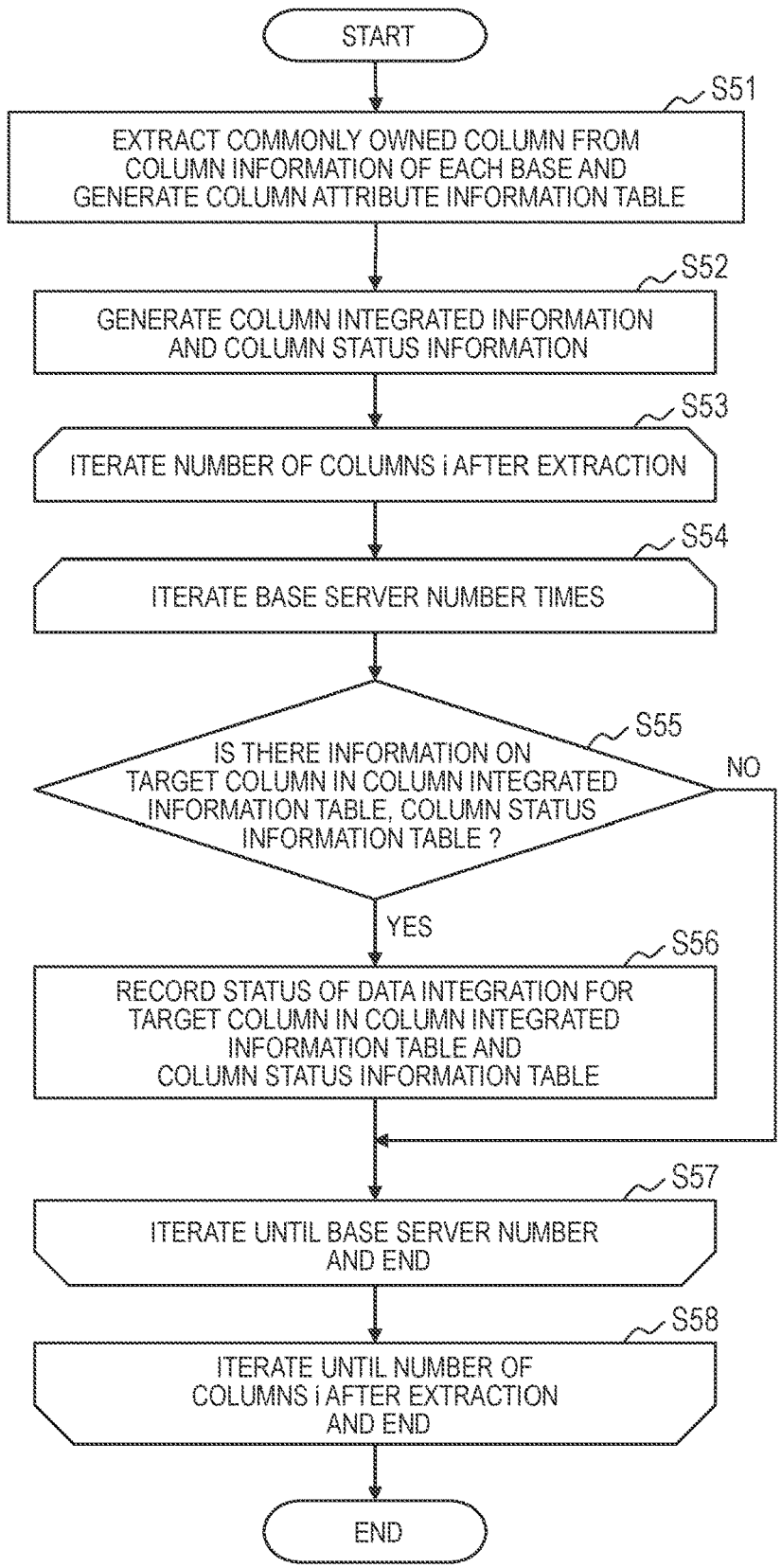
FIG. 6 is a flowchart for illustrating an example of processing performed by the integrated column extraction module of the central server according to the first embodiment of this invention.

FIG. 6 is a flowchart for illustrating an example of processing performed by the integrated column extraction module 21 of the central server 1. This processing is performed in Step S42 of FIG. 5.

In Step S51, the integrated column extraction module 21 selects common column names 572 and column attributes 573 from the base column information table 57 of each base 2 to generate the column integration information table 29. The integrated column extraction module 21 sequentially assigns the column ID 281 and sets the column name 282 and the column attribute 283 in the common column data at each base 2. As described above, the column integration information table 29 and the column status table 30 are generated in Step S52.

In Step S53, the integrated column extraction module 21 iterates processing until Step S58 for a number=i of the column IDs 281 assigned to the column integration information table 29. Further, in Step S54, the integrated column extraction module 21 iterates processing until Step S57 for the number of base servers 4.

In Step S55, the integrated column extraction module 21 determines whether there is data in a column that matches the column name 282 and the column attribute 283 using the currently selected column ID 281=i and the currently selected base data 56. If there is data, the integrated column extraction module 21 proceeds to Step S56 and if there is no data, the integrated column extraction module 21 proceeds to Step S57.

In Step S56, for the column ID=i, the integrated column extraction module 21 sets the integration information and the integrated rate 292 in the column integration information table 29 and sets the above-mentioned match rate in the column status table 30.

By iterating the above-mentioned processing on information on the columns to be integrated at each base 2 and further iterating the processing until the column ID=i, the column integration information table 29 and the column status table 30 are generated.

FIG. 7 is a flowchart for illustrating an example of processing performed by the replacement calculation module 23 of the central server 1. This processing is performed in Step S43 of FIG. 5.

In Step S61, the replacement calculation module 23 selects a column that has not yet undergone replacement calculation and the column ID 291 with the highest integrated rate 292 in the column integration information table 29. Note that, although not shown in the drawings, a flag or a bit that indicates whether the replacement calculation has been performed is set in the base column information table 57 and the like, and the flag or bit only needs to be set when the replacement calculation module 23 performs processing.

Next, in Step S62, the replacement calculation module 23 determines whether there is a column that can be integrated into the column ID 291. If there is a column that can be integrated, the replacement calculation module 23 proceeds to Step S63 and if there is no column that can be integrated, the replacement calculation module 23 proceeds to Step S66.

If, for example, there is a combination in the integration source 583 of the base column integration table 58 of each base 2 including the selected column ID 281, the replacement calculation module 23 selects that combination as a combination of columns that needs replacing. Taking the column ID=4 illustrated in FIG. 13 as an example, an integrated rate of 90% indicates a state in which the data of the base ID=1 has not been integrated. To solve this, the replacement calculation module 23 refers to the column priority table 59 of the base ID=1 to determine whether the column ID=4 is not integrated into another column, and then replaces the column.

Then, in Step S63, the replacement calculation module 23 updates the column priority table 59 of the base 2 corresponding to the combination by setting the prioritized column ID 592 of the selected column ID 281 and setting the integration destination 582 of the selected combination as the non-prioritized column ID 583. Note that, although not shown in the drawings, the column priority table 59 of the applicable entry may include a flag or a bit that indicates a replacement command.

Next, the replacement calculation module 23 calculates the integrated rate 292 assuming that the base data 56 of the applicable base 2 has been replaced for the column ID 281 set in the prioritized column ID 592. Then, in Step S64, the replacement calculation module 23 determines whether the integrated rate 292 is 100% assuming that the replacement has occurred.

In other words, the replacement calculation module 23 determines that all the base data 56 in the prioritized column ID 592 has been integrated. If all the base data 56 has been integrated, the replacement calculation module 23 proceeds to Step S65. If all the base data 56 has not been integrated, the replacement calculation module 23 returns to Step S62 and iterates the above-mentioned processing.

Next, in Step S65, the replacement calculation module 23 calculates a replaced status, writes that status into the column status table 30 and locks the column corresponding to the replaced portion. With this configuration, the column status table 30 of the applicable base 2 is confirmed.

In Step S66, the replacement calculation module 23 searches the column integration information table 29 to determine whether the integrated rate 292 has exceeded 0% and whether there is a column for which replacement calculation is not complete. In other words, the replacement calculation module 23 determines whether there is base data 56 that is integrated into another column but has not undergone the replacement calculation.

If there is base data 56 that is integrated into another column but has not undergone the replacement calculation, the replacement calculation module 23 returns to Step S61 and iterates the above-mentioned processing. If there is no base data 56 that is integrated into another column but has not undergone the replacement calculation, the replacement calculation module 23 ends the current processing and returns to the processing of FIG. 5.

By performing the above-mentioned processing, the replacement calculation module 23 can detect a replaceable column and update the column priority table 59 for each base 2, to thereby output an instruction to replace columns to be integrated to each base server 4.

According to Embodiment 1, when the base data 56 is joined on the basis of information on columns to be integrated collected from each base 2, the central server 1 of the central base detects combinations of columns of data that can be reduced and notifies this to each base 2, to thereby optimize statistical processing at each base 2 and reduce the amount of base data 56 collected by the central server 1 of the central base.

Note that, in Embodiment 1, there is described an example in which the total base data 15 in which the base data 56 is joined after the combination of columns (the number of columns of the base data 56 (total base data 15) after joining is the smallest) of columns that increases that number of integratable columns becomes zero using to the replacement calculation module 23 of the central server 1, but the present invention is not limited thereto. For example, the central server 1 may send the combination of columns that increases that number of integratable columns to the base server 4 as the replacement instruction and then join the currently received base data 56 to generate the total base data 15 and cause the central analysis module 25 to perform analysis. Then, the central server 1 may use the base data 56 that reflects the replacement instruction for the next analysis.

Further, in Embodiment 1, there is described an example in which the combination of columns that increases that number of integratable columns is sent to the base server 4 by being included in the column priority table 59, but the present invention is not limited thereto. For example, the central server 1 can send the combination of columns that increases that number of integratable columns to the base server 4 as the replacement instruction.

Embodiment 2

FIGS. 19 to 23 are illustrations of Embodiment 2 of the present invention. In Embodiment 1 described above, as illustrated in Step S64 of FIG. 7, there is described an example in which the integration source column is excluded and the integration destination column is used when all of the rows match. However, in Embodiment 2, the integration source column is integrated into the integration destination column at a match rate greater than or equal to a threshold value. Note that other configurations are the same as Embodiment 1.

Figure 19:
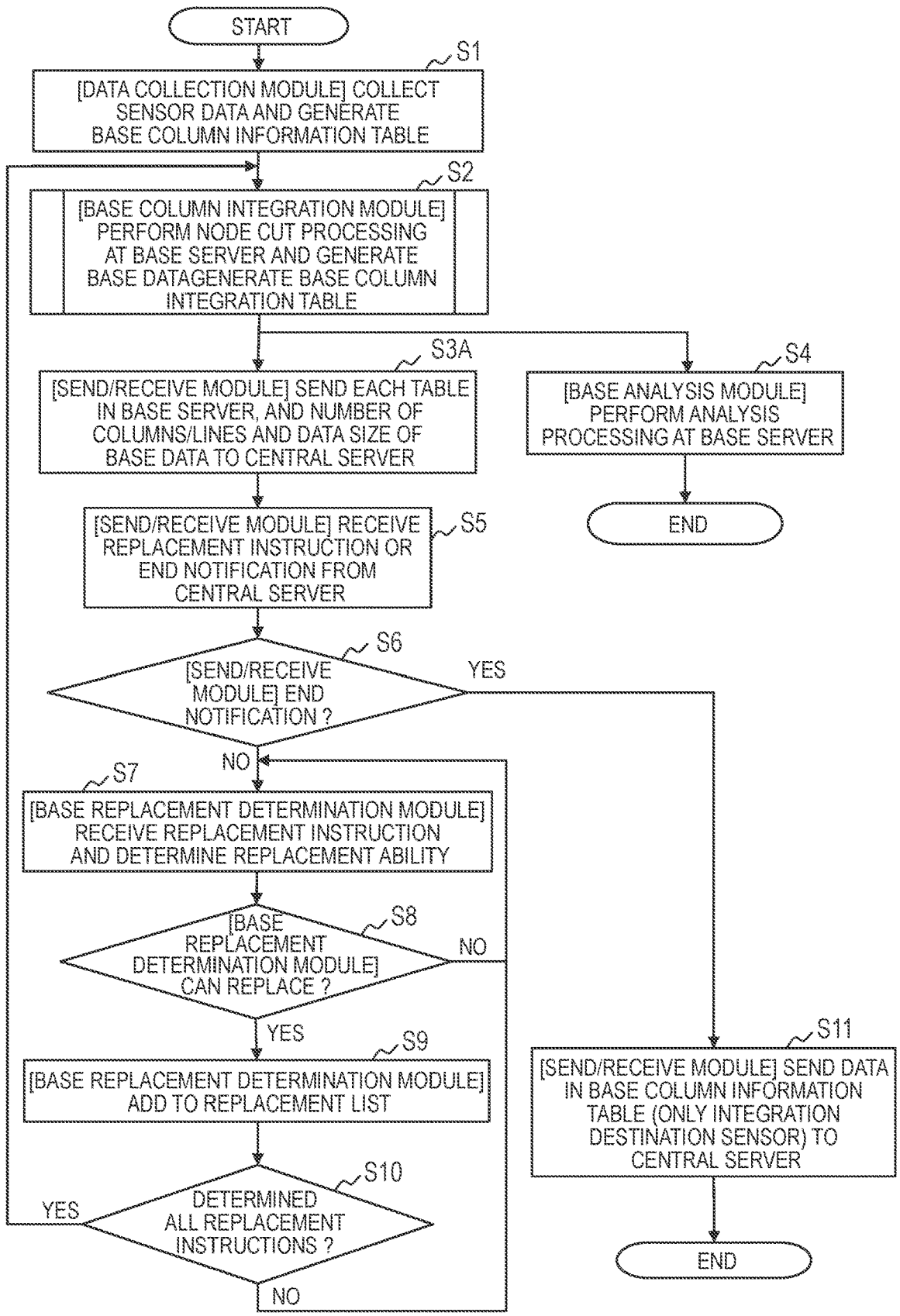
FIG. 19 is a flowchart illustrating an example of processing performed at the base server according to a second embodiment of this invention.

FIG. 19 is a flowchart illustrating Embodiment 2 and an example of processing performed at the base server 4. In Embodiment 2, in the processing of FIG. 2 in Embodiment 1, Step S3 is replaced by Step S3A but other processing is the same as that of FIG. 2 in Embodiment 1.

Step S3A differs from Embodiment 1 in that, in Step S3A, the send/receive module 55 sends a number of columns of base data 56 to the central server 1 in addition to the data in the base column information table 57, the data in the base column integration table 58 and the number of rows and size of the base data 56.

Figure 20:
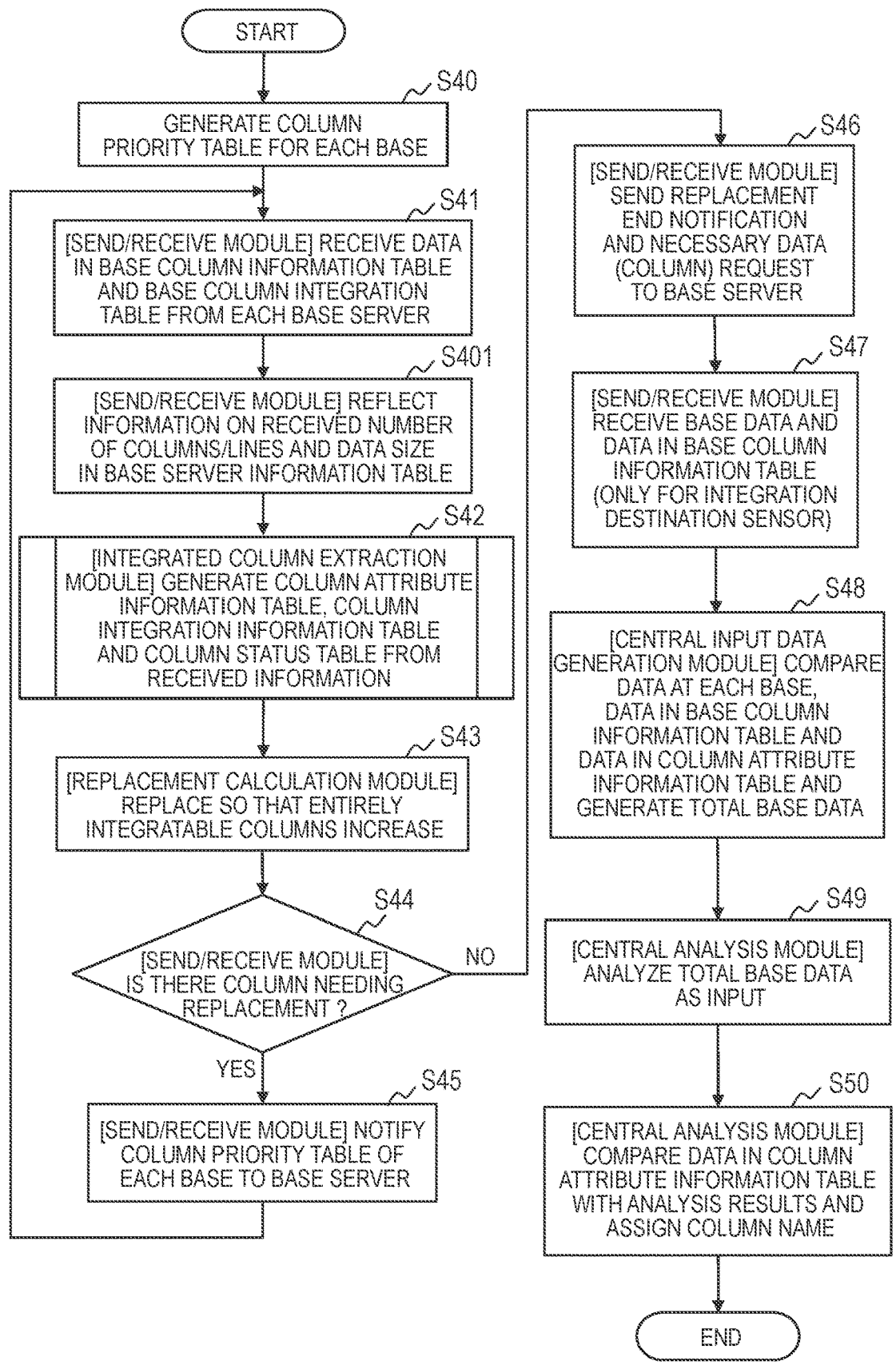
FIG. 20 is a flowchart for illustrating an example of processing performed at the central server according to the second embodiment of this invention.

FIG. 20 is a flowchart for illustrating an example of processing performed at the central server 1. In Embodiment 2, in the processing of FIG. 5 in Embodiment 1, a Step S401 is added after Step S41 but other processing is the same as that of FIG. 5 in Embodiment 1.

In Step S401, the send/receive module 22 of the central server 1 receives information on the number of columns, the number of rows and the data size of the base data and sets this information in the base server information table 27. Because of this, as illustrated in FIG. 22, a data column number 276 field is added to the base server information table 27 to store the number of columns of the base data 56.

Figure 21:
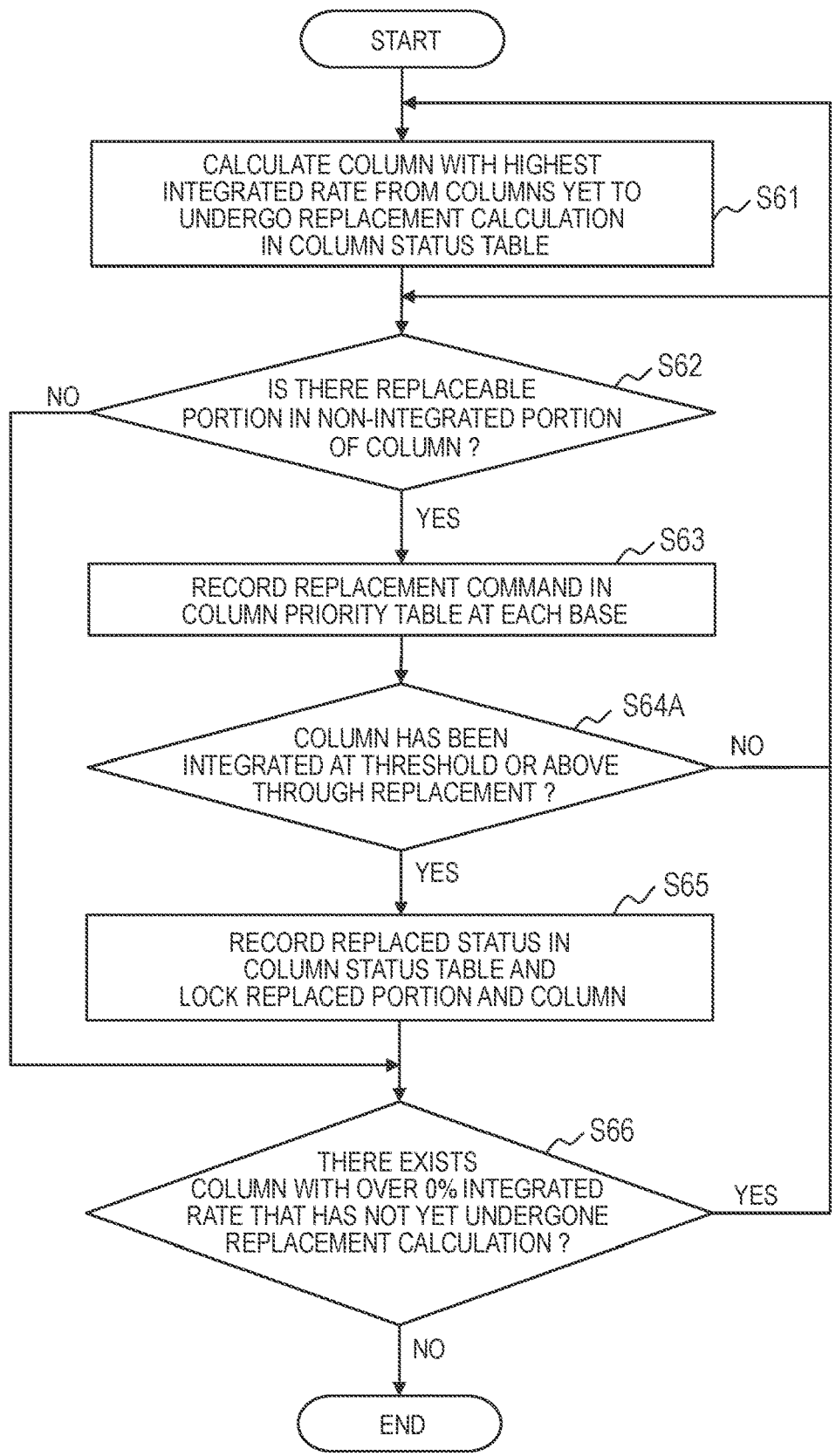
FIG. 21 is a flowchart for illustrating an example of processing performed by the replacement calculation module of the central server according to the second embodiment of this invention.

FIG. 21 is a flowchart for illustrating an example of processing performed by the replacement calculation module 23 of the central server 1. In Embodiment 2, Step S64 in FIG. 7 of Embodiment 1 is changed to Step S64A but other processing is the same as that of FIG. 7 in Embodiment 1.

In Step S64, the replacement calculation module 23 determines whether the integrated rate 292 assuming that replacement has been performed is equal to or more than a predetermined threshold value (for example, 70%). In other words, the replacement calculation module 23 determines that a row in the base data 56 that is equal to or more than the threshold value has been integrated into the prioritized column ID 592. If the row that is equal to or more than the threshold value has been integrated, the replacement calculation module 23 proceeds to Step S65. If the row that is equal to or more than the threshold value has not been integrated, the replacement calculation module 23 returns to Step S62 and the above-mentioned processing is iterated.

Figure 23:
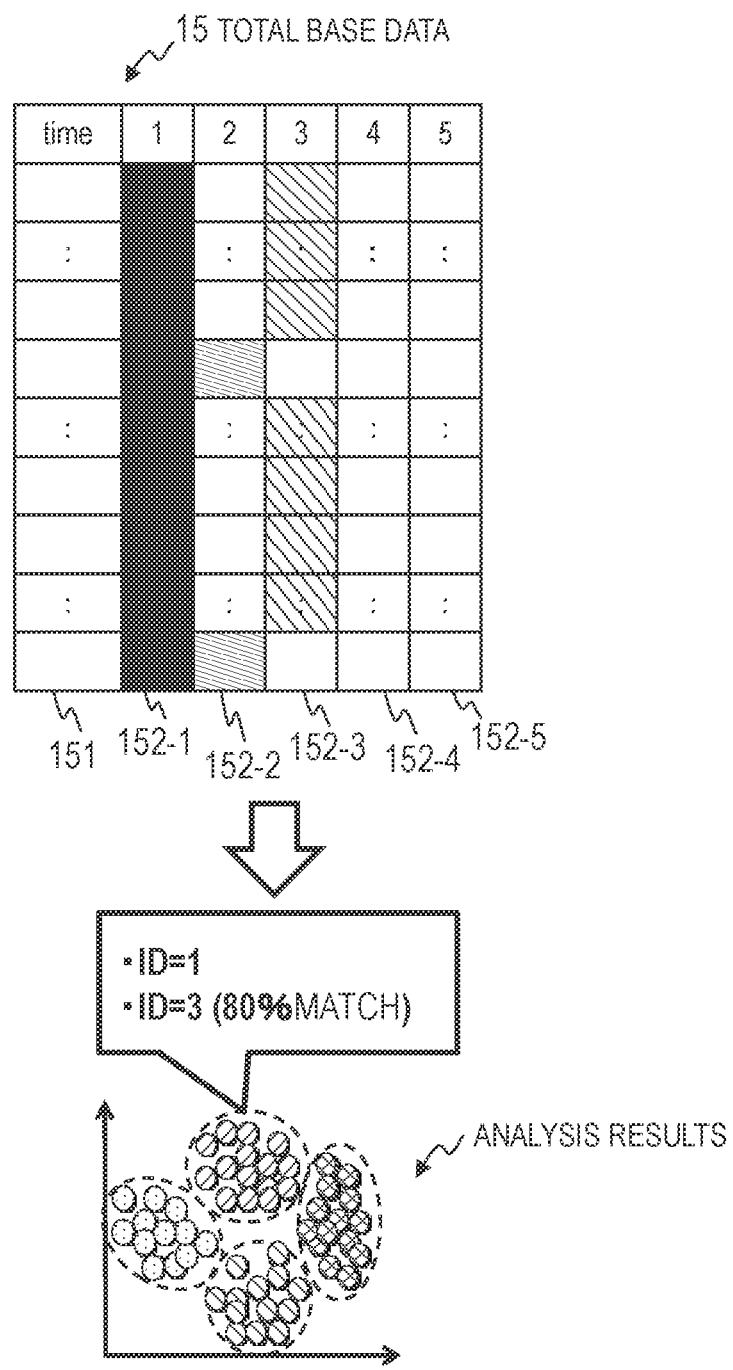
FIG. 23 is a diagram for illustrating an example of the total base data of the central server and analytical results according to the second embodiment of this invention.

FIG. 23 is a diagram for illustrating an example of the total base data 15 of the central server 1 and analytical results. In Embodiment 2, there is described an example in which a match rate between the column ID=1 at the integration source and the integration destination of the column ID=3 is 80%.

In Embodiment 2, because the match rate between rows in the column IDs of the integration destination and the integration source need only be equal to or more than the threshold value, the match rate can be displayed in the analysis results to observe transition in the column ID and the match rate per analysis, and hence the match rate can be used to detect age-related deterioration and abnormalities.

Embodiment 3

Figure 24:
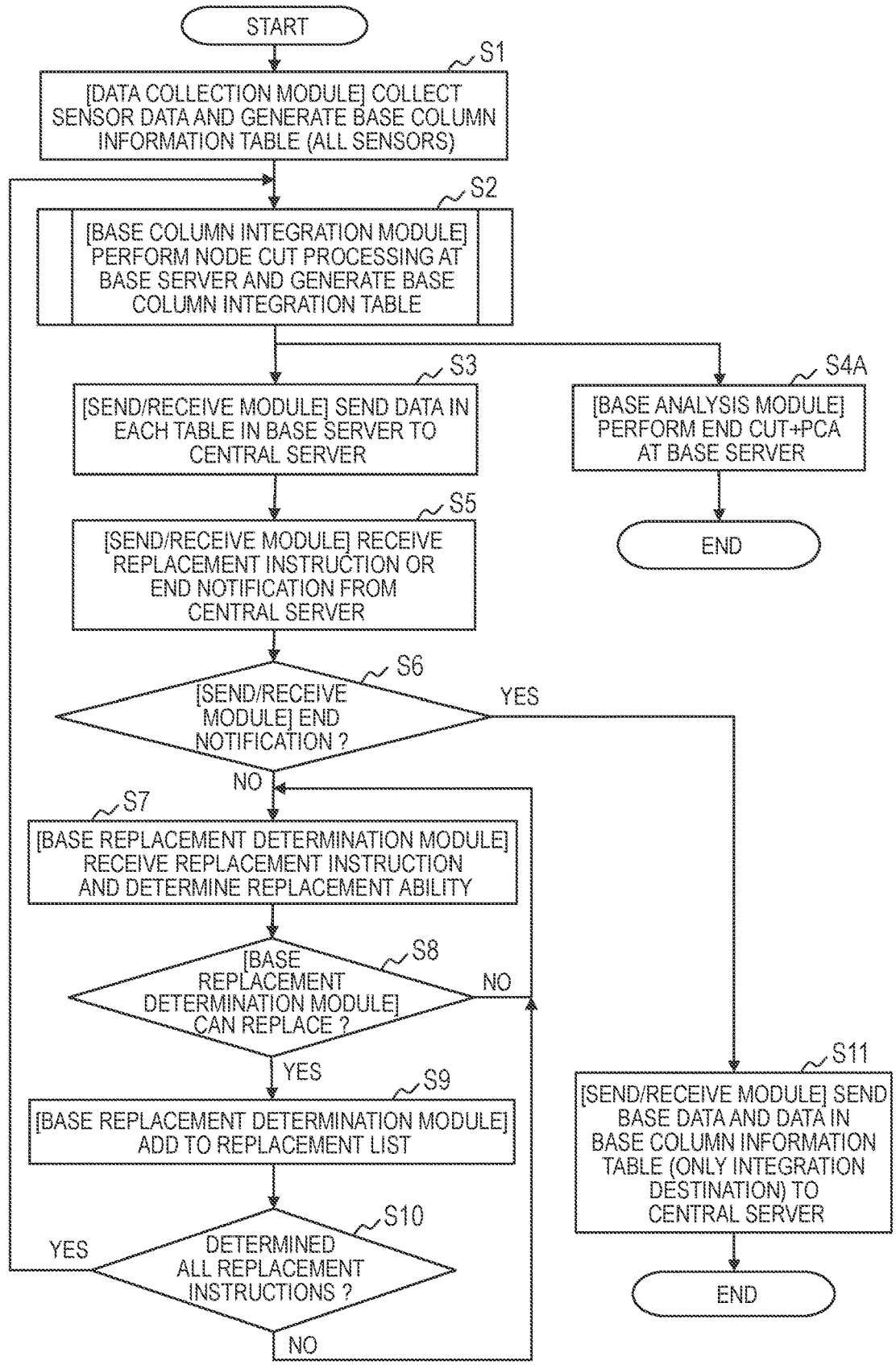
FIG. 24 is a flowchart for illustrating an example of processing performed by the base server according to a third embodiment of this invention.
Figure 25:
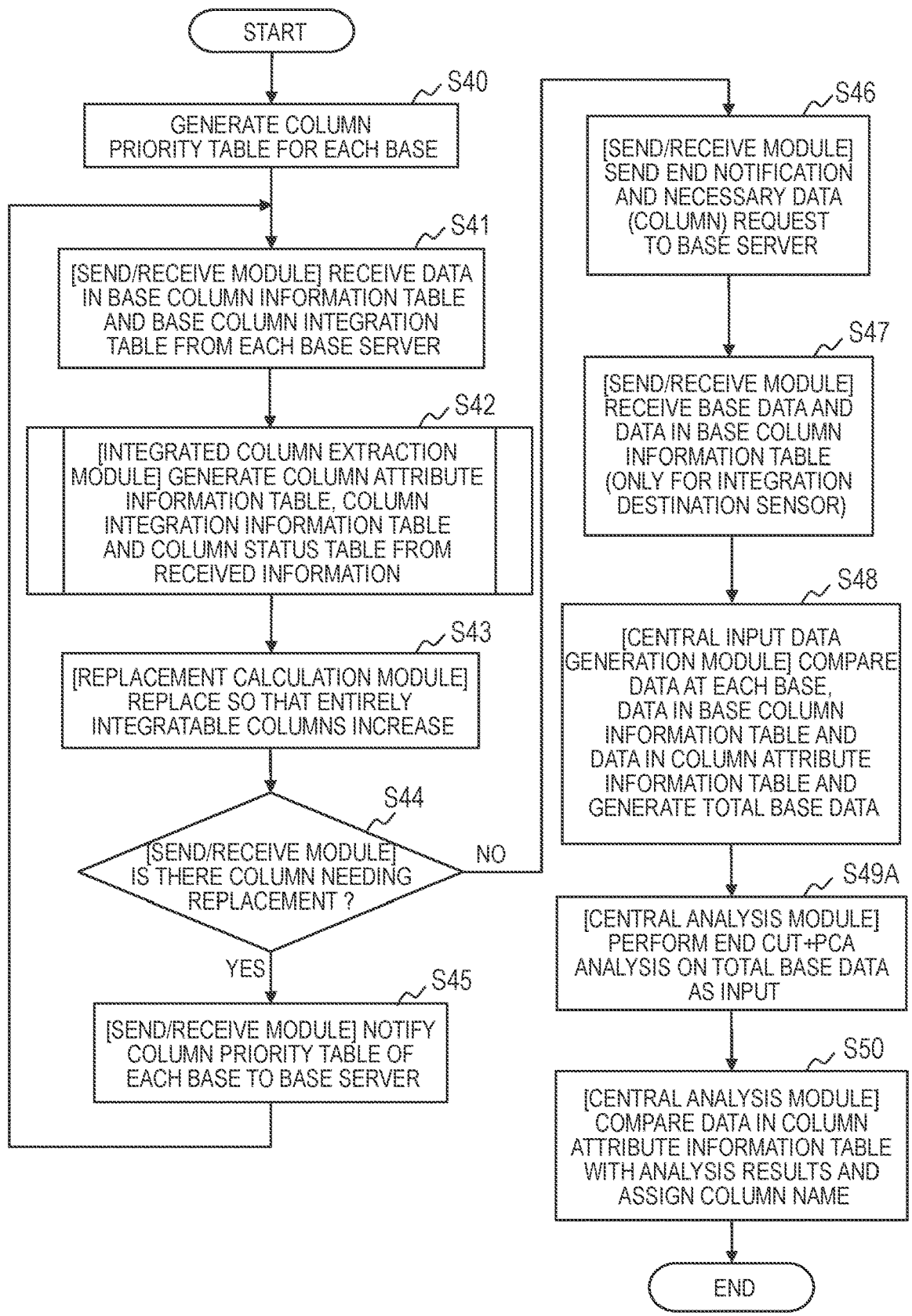
FIG. 25 is a flowchart for illustrating an example of processing performed by the central server according to a third embodiment of this invention.
Figure 27:
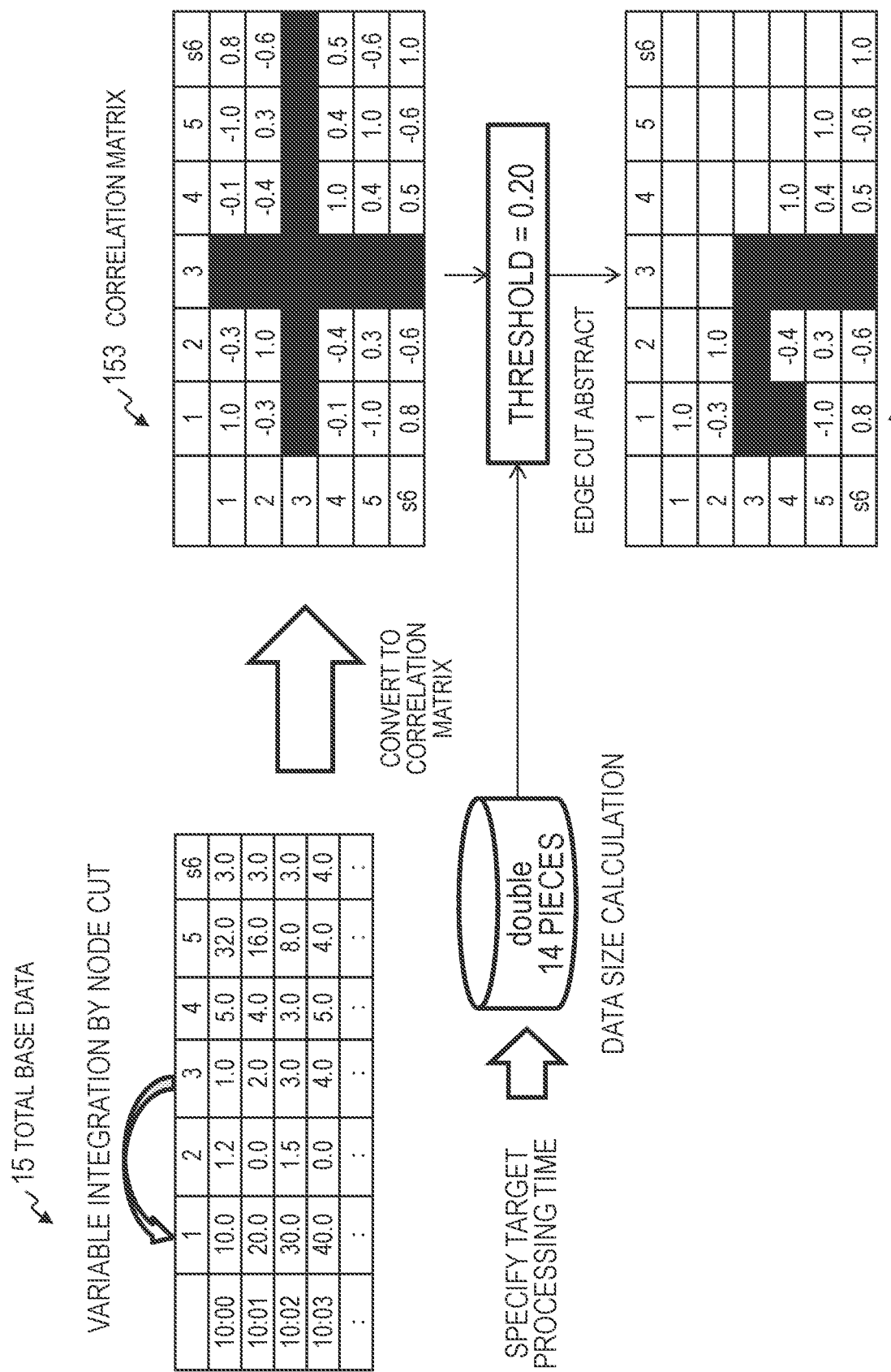
FIG. 27 is a diagram for illustrating an example in which node-cut processing is performed before the edge-cut processing is applied according to the third embodiment of this invention.

FIGS. 24, 25 and 27 illustrate Embodiment 3 of the present invention. In Embodiment 3, the base analysis module 54 and the central analysis module 25 perform data compression and principal component analysis (PCA). Note that other configurations are the same as Embodiment 1. Also note that Embodiment 3 describes an example in which the technology (hereinafter referred to as edge-cut processing) of compressing data using graphs described in Patent Literature 2 is adopted as the method of data compression.

FIG. 24 is a flowchart for illustrating an example of processing performed by the base server 4. In Embodiment 3, in the processing of FIG. 2 in Embodiment 1, Step S4 is replaced with Step S4A but other processing is the same as that of FIG. 2 in Embodiment 1.

In Step S4A, the base analysis module 54 performs PCA after compressing the base data 56 using the edge-cut processing.

FIG. 25 is a flowchart for illustrating an example of processing performed by the central server 1. In Embodiment 3, in the processing of FIG. 5 of Embodiment 1, Step S49 is replaced with Step S49A but other processing is the same as that of FIG. 5 in Embodiment 1.

In Step S49A, the central analysis module 25 performs PCA after compressing the total base data 15 using the edge-cut processing.

Figure 26:
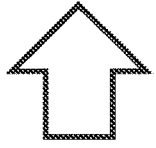
FIG. 26 is a diagram for illustrating a conventional example that employs edge-cut processing according to the third embodiment of this invention.

FIG. 26 is a diagram for illustrating a conventional example that employs edge-cut processing as PCA. Edge-cut processing is a technology of receiving a target processing time and excluding low-correlation data. Here, when there are many indexes with a high degree of correlation in the total base data 15 to be processed, there are cases where calculation errors increase and it becomes difficult to see the original relationship in a correlation row column 152. This is because, for example, the threshold value of the edge-cut processing is large.

FIG. 27 is a diagram for illustrating Embodiment 3 and illustrates an example in which node-cut processing is performed before the edge-cut processing is applied. In Embodiment 3, similar to Embodiment 1, the node-cut processing is performed to generate the total base data 15 (the base data 56 at the base 2).

Then, in Embodiment 3, the central server 1 generates a correlation row column 153 from the total base data 15 that has been subjected to node-cut processing, performs the edge-cut processing on the correlation row column 152 and obtains a correlation row column 154. With this configuration, increase in the threshold value during edge-cut processing and calculation errors can be minimized.

Embodiment 4

Figure 28:
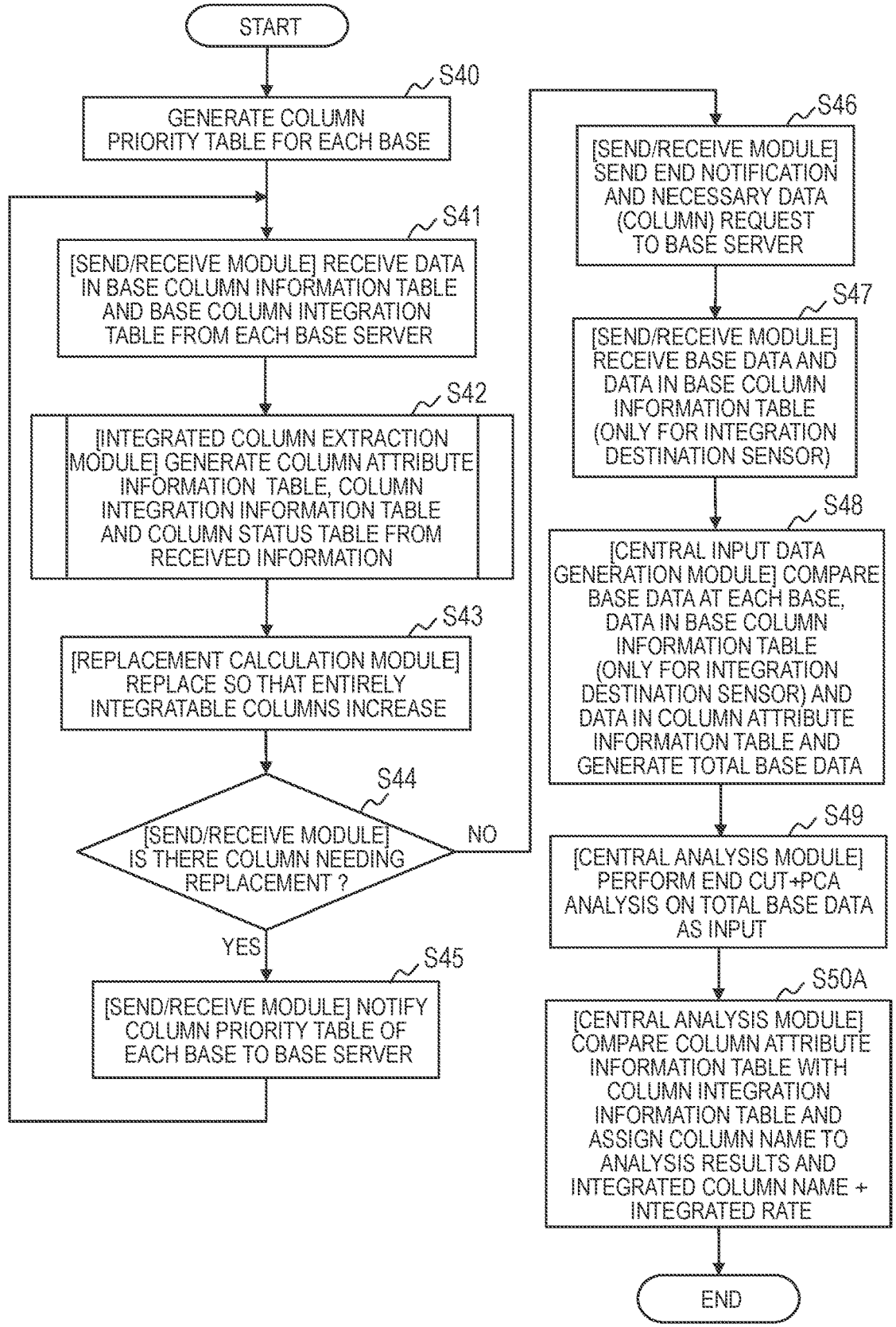
FIG. 28 is a flowchart for illustrating an example of processing performed at the central server according to a fourth embodiment of this invention.
Figure 30:
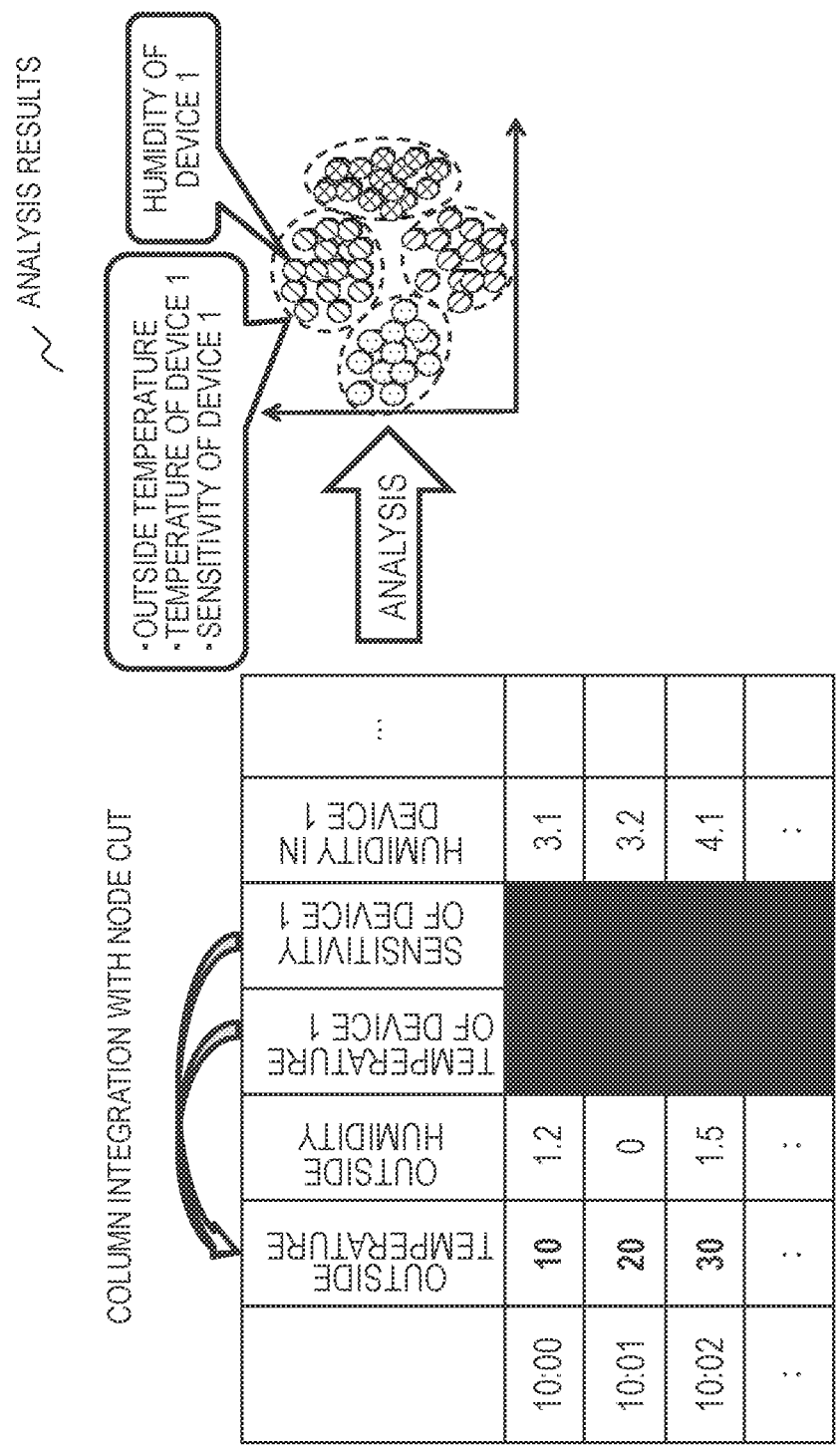
FIG. 30 is a diagram for illustrating an example of analysis results and total base data according to the fourth embodiment of this invention.

FIGS. 28 and 30 illustrate Embodiment 4 of the present invention. In Embodiment 4, in the processing of Embodiment 3, the name of the integration source column is assigned to the analysis results. Note that other configurations are the same as Embodiment 3.

FIG. 28 is a flowchart for illustrating an example of processing performed at the central server 1. In Embodiment 4, in the processing of Embodiment 1, Step S50 is replaced by Step S50A but other processing is the same as that of FIG. 5 of Embodiment 1.

In Step S50A, the central analysis module 25 compares the column ID in the analysis results to the column ID 281 in the column attribute information table 28 to acquire the column name 282 of the analysis results and assign the column name 282 to the analysis results. In addition, the central analysis module 25 compares the column ID in the analysis results to the column ID in the column integration information table 29 to acquire the column ID at the integration source and the column name 282 of the integration source from the column attribute information table 28 and assign the column name to the analysis results.

Figure 29:
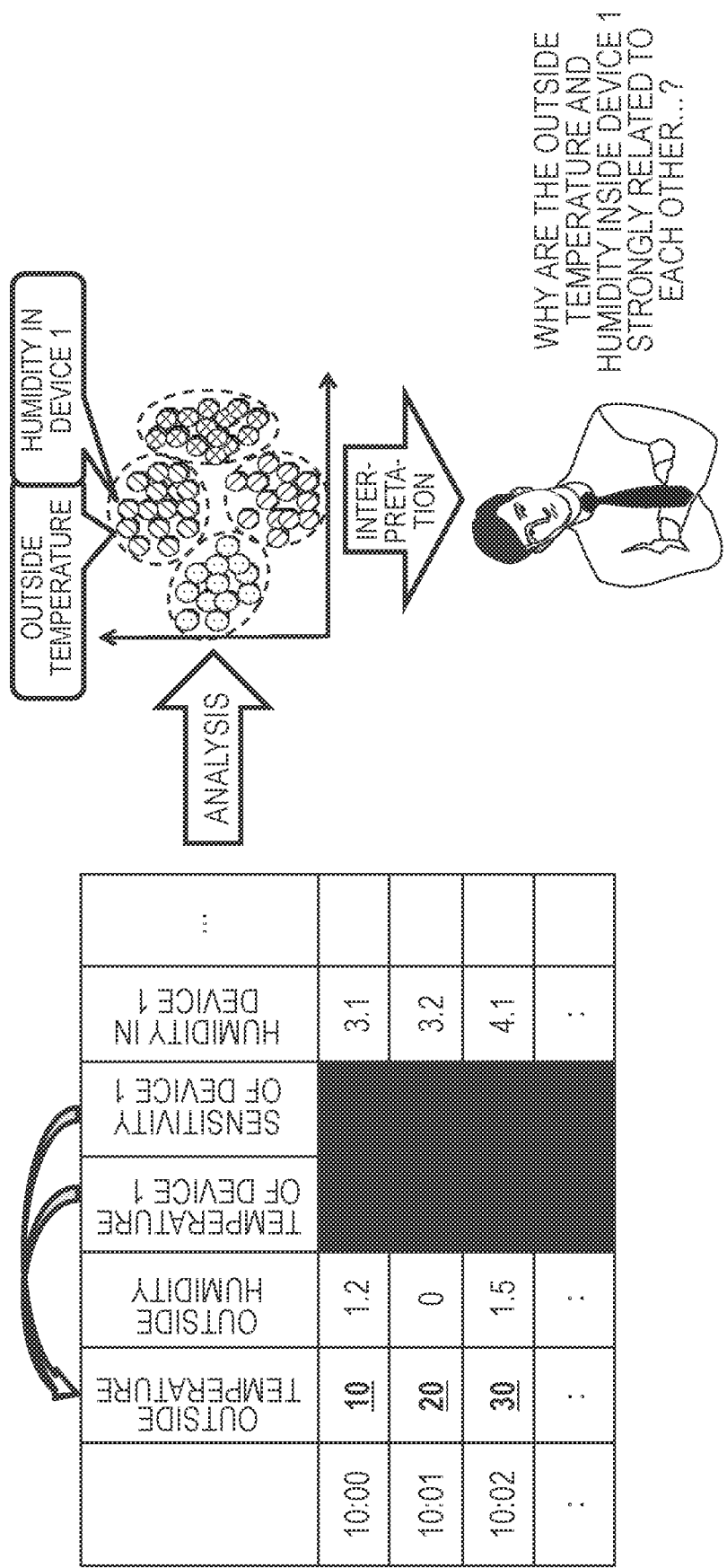
FIG. 29 is a diagram for illustrating an example of analysis results output by the central server according to the fourth embodiment of this invention.

FIG. 29 is a diagram for illustrating an example of analysis results output by the central server 1. Embodiment 4 provides an advantage in that the correlation between original column data is clear because the name of column and the name of the column at the integration source are written together in the analysis result.

CONCLUSION

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A non-transitory, computer-readable storage medium storing a program that controls a distributed data processing system in which a central server that has a processor and a memory that processes data collected from a base server that has a processor and a memory, wherein the program causes the distributed data processing system to execute:
   a first step in which the base server generates base data using node-cut processing after collecting and standardizing the data;
   a second step in which the central server collects attribute information on columns of the base data from a plurality of the base servers and a relationship between an integration source and an integration destination of the base data using the node-cut processing of the base server as base column integration information;
   a third step in which, when a plurality of the base data is integrated on the basis of the attribute information on the columns and the base column integration information, the central server performs replacement calculation of replacing the integration source with the integration destination and calculating a combination of the integration source and the integration destination with which an amount of data can be reduced; and
   a fourth step in which, when a result of the replacement calculation indicates that there is a combination of the integration source and the integration destination with which the amount of data can be reduced, the central server notifies the base server of the combination as a replacement instruction,
   wherein the node-cut processing includes excluding an integration source column when a ratio of a number of rows with matching values of integration source columns and integration destination columns is equal to or more than a predetermined threshold value.

2. The non-transitory, computer-readable storage medium storing a program that controls a distributed data processing system according to claim 1, wherein the program causes the distributed data processing system to further execute:
   a fifth step in which the base server receives the replacement instruction from the central server and regenerates the base data; and
   a sixth step in which the central server collects a plurality of the base data and joins the collected base data to generate total base data.

3. The non-transitory, computer-readable storage medium storing a program that controls a distributed data processing system according to claim 2, wherein the program causes the distributed data processing system to further execute a seventh step in which the central server performs predetermined analysis after performing an edge-cut processing on the total base data.

4. The non-transitory, computer-readable storage medium storing a program that controls a distributed data processing system according to claim 2, wherein the replacement calculation involves replacing an integration destination column with an integration source column in the base data on the basis of a relationship between the attributes of the columns of the base data and the integration source and the integration destination of the base data determined by node-cut processing by the base server, to thereby calculate a combination of columns with which an amount of data can be reduced when the plurality of base data is integrated.

5. The non-transitory, computer-readable storage medium storing a program that controls a distributed data processing system according to claim 2, wherein the program causes the distributed data processing system to further execute an eighth step in which the central server performs predetermined analysis on the total base data,
   wherein, in the eighth step, the central server calculates a ratio of a number of rows with matching values of integration source columns and integration destination columns as a match rate for the total base data and assigns the match rate to a result of the analysis.

6. The non-transitory, computer-readable storage medium storing a program that controls a distributed data processing system according to claim 2, wherein the program causes the distributed data processing system to further execute an eighth step in which the central server performs predetermined analysis on the total base data,
   wherein, in the eighth step, the central server acquires information on integration source columns from a relationship between the integration source and the integration destination of the base data determined by the node-cut processing performed by the base server for the total base data and assigns the information on the integration source column to a result of the analysis.

7. A distributed data processing system including a central server that has a processor and a memory and a base server that has a processor and a memory,
the base server including:
a data collection module configured to collect data; and
a base column integration module configured to generate base data using node-cut processing after standardizing the collected data,
the central server including:
an integrated column extraction module configured to collect attribute information on columns of the base data from a plurality of the base servers and a relationship between an integration source and an integration destination of the base data using the node-cut processing of the base server as base column integration information;
a replacement calculation module configured to, when the plurality of the base data is joined on the basis of the attribute information on the columns and the base column integration information, replace the integration source with the integration destination and calculate a combination of the integration source and the integration destination with which an amount of data can be reduced; and
a send/receive module configured to, when a result of the replacement calculation indicates that there is a combination of the integration source and the integration destination with which the amount of data can be reduced, notify the base server of the combination as a replacement instruction,
wherein the node-cut processing includes excluding an integration source column when a ratio of a number of rows with matching values of integration source columns and integration destination columns is equal to or more than a predetermined threshold value.

8. The distributed data processing system according to claim 7, wherein:
the base server receives the replacement instruction from the central server and regenerates the base data; and
the central server further includes a central input data generation module configured to collect a plurality of the base data and join the collected base data to generate total base data.

9. The distributed data processing system according to claim 8, wherein the central server further includes a central analysis module configured to perform predetermined analysis after performing the an edge-cut processing on the total base data.

10. The distributed data processing system according to claim 7, wherein the replacement calculation module involves replacing an integration destination column with an integration source column in the base data on the basis of a relationship between the attributes of the columns of the base data and the integration source and the integration destination of the base data determined by node-cut processing by the base server, to thereby calculate a combination of columns with which an amount of data can be reduced when the plurality of base data is joined.

11. The distributed data processing system according to claim 8, wherein:
the central server further includes a central analysis module configured to perform predetermined analysis on the total base data; and
the central analysis module calculates a ratio of a number of rows with matching values of integration source columns and integration destination columns as a match rate for the total base data and assigns the match rate to a result of the analysis.

12. The distributed data processing system according to claim 8, wherein:
the central server further includes a central analysis module configured to perform predetermined analysis on the total base data; and
the central analysis module acquires information on integration source columns from a relationship between the integration source and the integration destination of the base data determined by the node-cut processing performed by the base server for the total base data and assigns the information on the integration source column to a result of the analysis.

13. A non-transitory, computer-readable storage medium storing a program that controls a base server that has a processor and a memory, wherein the program causes the base server to execute:
a first step of collecting, as base column integration information, attribute information on columns of a plurality of base data and a relationship between an integration source and an integration destination of the base data using node-cut processing;
a second step of, when the plurality of base data is joined on the basis of the attribute information on the columns and the base column integration information, performing replacement calculation of replacing the integration source with the integration destination and calculating a combination of the integration source and the integration destination with which an amount of data can be reduced; and
a third step of, when a result of the replacement calculation indicates that there is a combination of the integration source and the integration destination with which the amount of data can be reduced, outputting the combination as a replacement instruction,
wherein the node-cut processing includes excluding an integration source column when a ratio of a number of rows with matching values of integration source columns and integration destination columns is equal to or more than a predetermined threshold value.

* * * * *